US012296632B2

(12) United States Patent
Agresti et al.

(10) Patent No.: US 12,296,632 B2
(45) Date of Patent: *May 13, 2025

(54) METALLIC REINFORCING CORD FOR TYRES FOR VEHICLE WHEELS

(71) Applicant: Pirelli Tyre S.p.A., Milan (IT)

(72) Inventors: Simone Agresti, Milan (IT); Guido Luigi Daghini, Milan (IT); Stefano Bizzi, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 284 days.

This patent is subject to a terminal disclaimer.

(21) Appl. No.: 17/757,071

(22) PCT Filed: Dec. 16, 2020

(86) PCT No.: PCT/IB2020/062035
§ 371 (c)(1),
(2) Date: Jun. 8, 2022

(87) PCT Pub. No.: WO2021/124154
PCT Pub. Date: Jun. 24, 2021

(65) Prior Publication Data
US 2022/0371367 A1   Nov. 24, 2022

(30) Foreign Application Priority Data
Dec. 17, 2019   (IT) .................. 102019000024289

(51) Int. Cl.
*B60C 9/00*   (2006.01)
*D02G 3/48*   (2006.01)
*D07B 1/06*   (2006.01)

(52) U.S. Cl.
CPC .......... *B60C 9/0007* (2013.01); *B60C 9/0057* (2013.01); *D02G 3/48* (2013.01);
(Continued)

(58) Field of Classification Search
CPC ...... B60C 9/0007; B60C 9/0057; D02G 3/48; D07B 1/0613; D07B 1/062
See application file for complete search history.

(56) References Cited

U.S. PATENT DOCUMENTS

| 1,815,779 A | 7/1931 | Fritz |
| 2,387,320 A | 10/1945 | Foster |

(Continued)

FOREIGN PATENT DOCUMENTS

| CN | 1165221 A | 11/1997 |
| CN | 1229866 A | 9/1999 |

(Continued)

OTHER PUBLICATIONS

International Search Report form the European Patent Office in corresponding International Application No. PCT/IB2020/062035 mailed Mar. 1, 2021.

(Continued)

*Primary Examiner* — Shaun R Hurley
(74) *Attorney, Agent, or Firm* — Finnegan, Henderson, Farabow, Garrett & Dunner, L.L.P.

(57) ABSTRACT

The invention relates to a metallic reinforcing cord (10) for tyres for vehicle wheels, comprising a plurality of metallic wires (11) twisted to one another with a single twisting pitch (P), or a single metallic wire twisted with at least one second metallic wire with a single twisting pitch, or a plurality of first metallic wires twisted to one another with a first twisting pitch to define a first strand of metallic wires and at least one second metallic wire twisted with said first strand of metallic wires with a second twisting pitch equal to or different from the first twisting pitch. The metallic reinforcing cord (10) has a part load elongation greater than or equal to 1%.

14 Claims, 14 Drawing Sheets

(52) U.S. Cl.
CPC .......... *D07B 1/0613* (2013.01); *D07B 1/062* (2013.01); *B60C 2009/0092* (2013.01); *D07B 2201/2029* (2013.01); *D07B 2401/2005* (2013.01)

(56) References Cited

U.S. PATENT DOCUMENTS

| | | | |
|---|---|---|---|
| 3,399,521 | A | 9/1968 | Thoma et al. |
| 4,197,894 | A | 4/1980 | Boileau |
| 4,333,306 | A | 6/1982 | Yamashita |
| 4,334,215 | A | 6/1982 | Frazier et al. |
| 4,606,392 | A | 8/1986 | Weidenhaupt et al. |
| 4,718,470 | A | 1/1988 | Kusakabe |
| 4,836,262 | A | 6/1989 | Nishizawa |
| 4,862,486 | A | 8/1989 | Wing et al. |
| 5,062,161 | A | 11/1991 | Sutton |
| 5,135,039 | A | 8/1992 | Mizuta |
| 5,162,067 | A | 11/1992 | Miyawaki |
| 5,213,652 | A | 3/1993 | Katoh |
| 5,223,060 | A | 6/1993 | Imamiya |
| 5,293,737 | A | 3/1994 | Kobayashi |
| 5,295,346 | A | 3/1994 | Bundo |
| 5,337,549 | A | 8/1994 | Kobayashi |
| 5,502,960 | A | 4/1996 | Kobayashi |
| 5,505,243 | A | 4/1996 | Imamiya |
| 5,584,169 | A | 12/1996 | Ikehara |
| 5,802,830 | A | 9/1998 | Kawatani |
| 5,843,583 | A | 12/1998 | D'Haene et al. |
| 6,425,428 | B1 | 7/2002 | Onuma |
| 10,793,979 | B2 | 10/2020 | Ridley |
| 11,771,546 | B2 | 10/2023 | Lima |
| 2001/0013385 | A1 | 8/2001 | Ohya |
| 2002/0009608 | A1 | 1/2002 | Nishikawa |
| 2002/0187345 | A1 | 12/2002 | Andrews |
| 2003/0010418 | A1 | 1/2003 | Miyazaki et al. |
| 2003/0046919 | A1 | 3/2003 | Noferi |
| 2003/0192157 | A1 | 10/2003 | Andrews |
| 2005/0069685 | A1 | 3/2005 | Andrews |
| 2005/0183808 | A1 | 8/2005 | Barquet |
| 2005/0288775 | A1 | 12/2005 | Dong |
| 2006/0150378 | A1 | 7/2006 | Andrews |
| 2009/0176119 | A1 | 7/2009 | Cristofani |
| 2010/0005774 | A1 | 1/2010 | Fukuda |
| 2010/0206450 | A1 | 8/2010 | Fukumoto |
| 2010/0218872 | A1 | 9/2010 | Ishizaka |
| 2010/0300576 | A1 | 12/2010 | Liu et al. |
| 2011/0099967 | A1 | 5/2011 | Daghini et al. |
| 2011/0240626 | A1 | 10/2011 | Mullebrouck |
| 2011/0290398 | A1 | 12/2011 | Yasuda |
| 2012/0267025 | A1 | 10/2012 | Daghini |
| 2013/0048185 | A1 | 2/2013 | Harikae et al. |
| 2013/0118668 | A1 | 5/2013 | Ascanelli et al. |
| 2014/0083590 | A1 | 3/2014 | Ascanelli |
| 2014/0338810 | A1 | 11/2014 | Daghini et al. |
| 2015/0097662 | A1 | 4/2015 | Yu et al. |
| 2015/0122395 | A1 | 5/2015 | Misani et al. |
| 2016/0318343 | A1 | 11/2016 | Daghini et al. |
| 2017/0027247 | A1 | 2/2017 | Lim |
| 2017/0313133 | A1 | 11/2017 | Ascanelli et al. |
| 2018/0291535 | A1 | 10/2018 | Ridley |
| 2018/0347078 | A1 | 12/2018 | Goenka et al. |
| 2018/0347080 | A1 | 12/2018 | Goenka et al. |
| 2019/0275835 | A1 | 9/2019 | Rampana et al. |
| 2021/0000587 | A1 | 1/2021 | Lima |
| 2021/0309050 | A1 | 10/2021 | Cornille |
| 2022/0371367 | A1 | 11/2022 | Agresti |
| 2023/0001741 | A1* | 1/2023 | Agresti ................ D07B 1/0646 |
| 2023/0366149 | A1* | 11/2023 | Agresti ................ D02G 3/406 |

FOREIGN PATENT DOCUMENTS

| | | |
|---|---|---|
| CN | 1280639 A | 1/2001 |
| CN | 1703551 A | 11/2005 |
| CN | 1708415 A | 12/2005 |
| CN | 1743188 A | 3/2006 |
| CN | 1965126 A | 5/2007 |
| CN | 103958218 A | 12/2011 |
| CN | 102369321 A | 3/2012 |
| CN | 102471998 A | 5/2012 |
| CN | 102639337 A | 8/2012 |
| CN | 102666133 A | 9/2012 |
| CN | 102971459 A | 3/2013 |
| CN | 103025543 A | 4/2013 |
| CN | 203498695 A | 3/2014 |
| CN | 104023997 A | 9/2014 |
| CN | 104 343 026 A | 2/2015 |
| CN | 107000483 A | 8/2017 |
| CN | 206646324 U | 11/2017 |
| CN | 109952209 A | 6/2019 |
| DE | 102012214866 A1 | 2/2013 |
| EP | 0 125 518 A2 | 11/1984 |
| EP | 0376272 A1 * | 7/1990 ........... B60C 9/0042 |
| EP | 1112868 A2 | 7/2001 |
| EP | 1 126 074 A2 | 8/2001 |
| EP | 1213159 A2 | 6/2002 |
| EP | 1270270 A1 | 1/2003 |
| EP | 2218588 A1 | 8/2010 |
| EP | 2261058 A1 | 12/2010 |
| JP | H07279071 A | 10/1995 |
| JP | 2006183211 A1 | 7/2006 |
| JP | 2007145125 A | 6/2007 |
| JP | 2009062655 A | 3/2009 |
| JP | 2010180483 A | 8/2010 |
| JP | 2010264878 A | 11/2010 |
| KR | 101194309 B1 | 10/2012 |
| WO | 2006010658 A1 | 2/2006 |
| WO | WO 2007/128335 A1 | 11/2007 |
| WO | WO 2012/017399 A1 | 2/2012 |
| WO | WO 2012/055677 A2 | 5/2012 |
| WO | 2013098735 A1 | 7/2013 |
| WO | 2014083535 A2 | 6/2014 |
| WO | 2015014639 A2 | 2/2015 |
| WO | 2012055677 A3 | 5/2015 |
| WO | 2015097609 A1 | 7/2015 |
| WO | 2020021006 A1 | 1/2020 |

OTHER PUBLICATIONS

Written Opinion of the International Searching Authority from the European Patent Office in corresponding International Application No. PCT/IB2020/062035 mailed Mar. 1, 2021.

Office Action issued by the European Patent Office on Jan. 18, 2024, in corresponding Application No. EP 20 838 618.5 (6 pages).

Notification of the First Office Action issued by the China National Intellectual Property Administration on May 30, 2023, in corresponding Application No. CN 202080085884.9 (9 pages).

Notification of the Second Office Action issued by the China National Intellectual Property Administration on Feb. 29, 2024, in corresponding Application No. CN 202080085884.9 (9 pages).

Notice of Allowance issued by the China National Intellectual Property Administration on May 23, 2024, in corresponding Application No. CN 202080085884.9 (5 pages).

Office Action issued by the European Patent Office on Nov. 15, 2024, in corresponding European Application No. 21 783 355.7 (6 pages).

XP055808009, Nokian Tyres: "Reinforcing Materials in Rubber Products", aroverket.com/, Mar. 1, 2015 (Mar. 1, 2015), Retrieved on May 27, 2021 from the Internet: URL :https://laroverket.com/wp-content/uploads/2015/03/reinforcing_materials.pdf.

International Search Report form the European Patent Office in corresponding International Application No. PCT/1B2020/062006 mailed Feb. 10, 2021.

Written Opinion of the International Searching Authority from the European Patent Office in corresponding International Application No. PCT/IB2020/062006 mailed Feb. 10, 2021.

Notification of the First Office Action dated Feb. 15, 2023, from China National Intellectual Property Administration, in counterpart Chinese Application No. 202080086028.5.

Office Action issued by the European Patent Office on Dec. 7, 2023, in corresponding European Application No. 20 823 709.9 (7 pages).

(56) References Cited

OTHER PUBLICATIONS

Office Action issued by the European Patent Office on Oct. 4, 2024, in corresponding European Application No. 20823709.9 (7 pages).
Notification of the First Office Action issued by the China National Intellectual Property Administration on Jul. 18, 2023, in Chinese Application No. CN 202080085859.0 (10 pages) with English translation.
Third Party Observations issued by the European Patent Office on Oct. 6, 2023, in European Application No. 20823709.9 (12 pages).
International Search Report form the European Patent Office in corresponding International Application No. PCT/IB2020/062014 mailed Mar. 3, 2021.
Written Opinion of the International Searching Authority from the European Patent Office in corresponding International Application No. PCT/IB2020/062014 mailed Mar. 3, 2021.
International Search Report form the European Patent Office in corresponding International Application No. PCT/IB2021/058714 mailed Dec. 21, 2021.
Written Opinion of the International Searching Authority from the European Patent Office in corresponding International Application No. PCT/IB2021/058714 mailed Dec. 21, 2021.
Notice of Allowance from Chinese Application No. 202080085859.0 issued May 2, 2024 (6 pages).
Third Party Observations issued by the European Patent Office on Apr. 10, 2024, in European Application No. 20823709.9 (7 pages).
Office Action issued by the European Patent Office on Oct. 11, 2024, in European Application No. 20 823.709.9 (9 pages).

\* cited by examiner

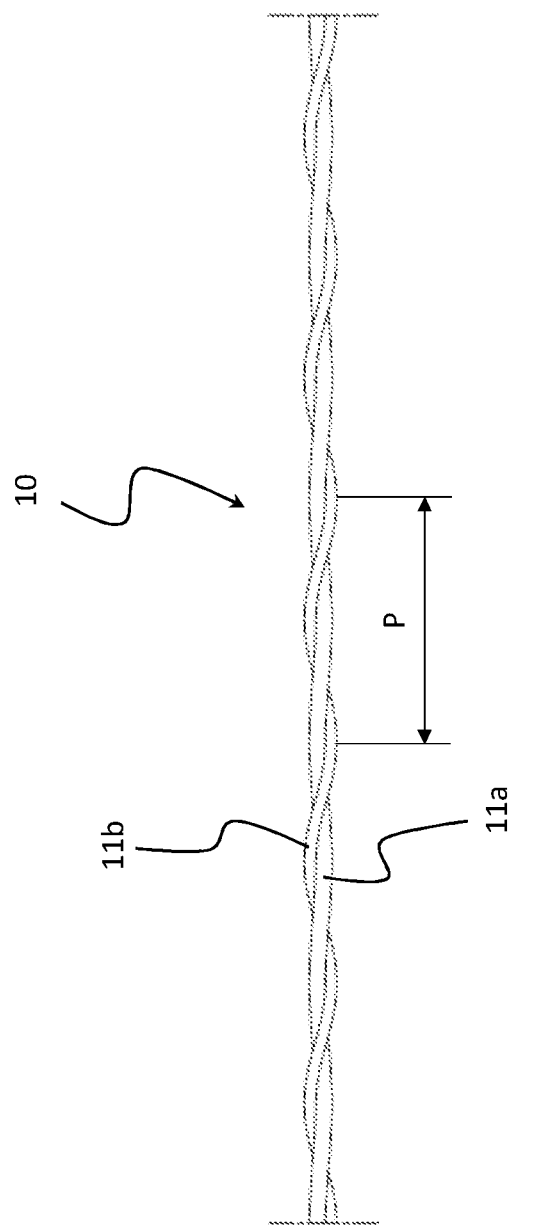

METALLIC REINFORCING CORD FOR TYRES FOR VEHICLE WHEELS

This application is a national stage filing under 35 U.S.C. § 371 of International Application No. PCT/IB2020/062035, filed on Dec. 16, 2020, which claims the benefit of priority to Italian Application No. 102019000024289, filed on Dec. 17, 2019; the disclosure of each of these applications are incorporated herein by reference in their entirety.

The present invention relates to a metallic reinforcing cord for tyres for vehicle wheels.

PRIOR ART

Metallic reinforcing cords for tyres for vehicle wheels are described in US2003046919 and in WO2007128335 to the Applicant and in WO2012055677.

SUMMARY OF THE INVENTION

Hereinafter, when reference is made to any range of values comprised between a minimum value and a maximum value, the aforementioned minimum and maximum values are included in the aforementioned range, unless expressly stated to the contrary.

Moreover, all of the ranges include any combination of the maximum and minimum values described and include any intermediate range, even if not expressly specifically described.

Any numerical value is considered to be preceded by the term "about" to also indicate any numerical value that differs slightly from the one described, for example to take into account the typical dimensional tolerances in the field of reference.

Hereinafter the following definitions apply.

The term "equatorial plane" of the tyre is used to indicate a plane perpendicular to the rotation axis of the tyre and that divides the tyre into two symmetrically equal parts.

The terms "radial" and "axial" and the expressions "radially inner/outer" and "axially inner/outer" are used with reference, respectively, to a direction substantially parallel to the equatorial plane of the tyre and to a direction substantially perpendicular to the equatorial plane of the tyre, i.e. to a direction substantially perpendicular to the rotation axis of the tyre and to a direction substantially parallel to the rotation axis of the tyre, respectively.

The terms "circumferential" and "circumferentially" are used with reference to the direction of annular extension of the tyre, i.e. to the rolling direction of the tyre, which corresponds to a direction lying on a plane coinciding with or substantially parallel to the equatorial plane of the tyre.

The term "substantially axial direction" is used to indicate a direction inclined, with respect to the equatorial plane of the tyre, by an angle comprised between 70° and 90°.

The term "substantially circumferential direction" is used to indicate a direction oriented, with respect to the equatorial plane of the tyre, at an angle comprised between 0° and 10°.

The expressions "upstream" and "downstream" are used with reference to a predetermined direction and to a predetermined reference. Therefore, assuming for example a direction from left to right and a reference taken along said direction, a position "downstream" with respect to the reference indicates a position to the right of said reference and a position "upstream" with respect to the reference indicates a position to the left of said reference.

The term "elastomeric material" is used to indicate a material comprising a vulcanizable natural or synthetic polymer and a reinforcing filler, wherein such a material, at room temperature and after having been subjected to vulcanization, can undergo deformations caused by a force and is capable of quickly and energetically recovering the substantially original shape and size after the elimination of the deforming force (according to the definitions of ASTM D1566-11 Standard Terminology Relating To Rubber).

The term "metallic reinforcing cord" is used to indicate an element consisting of one or more elongated elements (also called "wires") made of a metallic material and possibly coated by, or incorporated in, a matrix of elastomeric material.

The term "hybrid reinforcing cord" is used to indicate a reinforcing cord comprising at least one metallic wire twisted together with at least one textile yarn. Hereinafter, reference is made to hybrid reinforcing cords comprising textile yarns having low modulus, like for example nylon yarns.

The term "mixed textile reinforcing cord" is used to indicate a reinforcing cord comprising at least one textile yarn having a low modulus, like for example a nylon yarn, twisted together with at least one textile yarn having a high modulus, like for example an aramid yarn.

The term "yarn" is used to indicate an elongated element consisting of the aggregation of a plurality of textile filaments or fibers.

The yarns can have one or more "ends", where the term "end" is used to indicate a bundle of filaments twisted together. Preferably, a single end or at least two ends twisted together are provided.

The yarn can be identified with a symbol that represents the textile material, the linear density of the fiber used and the number of ends that form the yarn. For example, an aramid yarn (aromatic polyamide) identified as Ar1672 indicates a textile yarn comprising Aramid fibers with a linear density of 1670 dtex, formed by two ends twisted together.

The term "strand" is used to indicate the union of at least two wires or yarns, or of at least one wire and at least one yarn, to constitute an elongated element intended to be twisted with at least one other elongated element to form at least one part of a reinforcing cord.

The term "diameter" of a reinforcing cord, or of a wire, is used to indicate the diameter measured as prescribed by the method BISFA E10 (The International Bureau For The Standardization Of Man-Made Fibres, Internationally Agreed Methods For Testing Steel Tyre Cords, 1995 edition).

In the case of yarns, the term "diameter" is used to indicate the diameter of an ideal circumference that circumscribes all of the filaments that define the yarn. The diameter of a yarn increases as the number of filaments and/or ends of the yarn increases.

The term "thread count" of a layer is used to indicate the number of reinforcing cords per unit length provided in such a layer. The thread count can be measured in cords/dm (number of cords per decimeter).

The term "linear density" or "count" of a cord or yarn is used to indicate the weight of the cord or yarn per unit length. The linear density can be measured in dtex (grams per 10 km length).

The term "modulus" is used to indicate the ratio between load (or force) and elongation measured at any point of a load-elongation curve according to the BISFA standard. Such a curve is traced by calculating the first derivative of the load-elongation function that defines the aforementioned curve, normalized to the linear density expressed in Tex. The modulus is therefore expressed in cN/Tex. In a load-elongation graph, the modulus is identified by the slope of the aforementioned curve with respect to horizontal axis.

The term "initial modulus" is used to indicate the modulus calculated at the origin point of the load-elongation curve, i.e. for an elongation equal to zero.

The term "high modulus" is used to indicate an initial modulus equal to or greater than 3000 cN/Tex. The term "low modulus" is used to indicate an initial modulus lower than 3000 cN/Tex.

For the measurement of the linear density and of the modulus reference is made to flat wires/yarns, without twists applied in the testing phase or twisting phase, according to the tests regulated by BISFA.

The term "breaking load" and "elongation at break" of a reinforcing cord are used to indicate the load and the percentage elongation, respectively, at which the reinforcing cord breaks, evaluated with the method BISFA E6 (The International Bureau For The Standardization Of Man-Made Fibres, Internationally Agreed Methods For Testing Steel Tyre Cords, 1995 edition).

The term "part load elongation" of a reinforcing cord is used to indicate the difference between the percentage elongation obtained by subjecting the reinforcing cord to a traction of 50 N and the percentage elongation obtained by subjecting the reinforcing cord to a traction of 2.5 N. The part load elongation is evaluated with the method BISFA E7 (The International Bureau For The Standardization Of Man-Made Fibres, Internationally Agreed Methods For Testing Steel Tyre Cords, 1995 edition).

The term "rigidity" of a reinforcing cord is used to indicate the resistant moment to bending with a predetermined angle (normally 15°) evaluated with the method BISFA E8 (The International Bureau For The Standardization Of Man-Made Fibres, Internationally Agreed Methods For Testing Steel Tyre Cords, 1995 edition).

The term "metallic reinforcing cord having a high elongation", or "HE metallic reinforcing cord", is used to indicate a reinforcing cord that has:
  a) an elongation at break equal to at least 3.5% and, preferably
  b) a part load elongation comprised between 1% and 3%.

Feature "a" cited above is calculated with the method BISFA E6 (The International Bureau For The Standardization Of Man-Made Fibres, Internationally Agreed Methods For Testing Steel Tyre Cords, 1995 edition). Feature "b" cited above is calculated with the method BISFA E7 (The International Bureau For The Standardization Of Man-Made Fibres, Internationally Agreed Methods For Testing Steel Tyre Cords, 1995 edition).

The term "wire made of NT steel" (Normal Tensile Steel) is used to indicate a wire made of carbon steel having a tensile strength of 2800+200 MPa, for example having a tensile strength of at least 2700 MPa for a wire diameter of 0.28 mm.

The term "wire made of HT steel" (High Tensile Steel) is used to indicate a wire made of carbon steel having a tensile strength of 3200±200 MPa, for example a tensile strength of at least 3100 MPa for a wire diameter of 0.28 mm.

The term "wire made of ST steel" (Super Tensile Steel) is used to indicate a wire made of carbon steel having a tensile strength of 3500±200 MPa, for example a tensile strength of at least 3400 MPa for a wire diameter of 0.28 mm.

The term "wire made of UT steel" (Ultra Tensile Steel) is used to indicate a wire made of carbon steel having a tensile strength of 3900±200 MPa, for example a tensile strength of at least 3800 MPa for a wire diameter of 0.28 mm.

The tolerances #200 MPa are indicated to comprise, for each class of steel, the minimum and maximum tensile strength values due to the various wire diameters (typically the tensile strength value is inversely proportional to the diameter of the wire), for example for wire diameters comprised between 0.12 mm and 0.40 mm.

The term "mechanical behavior" of a reinforcing cord is used to indicate the reaction offered by the reinforcing cord when subjected to a load (or force). In the case of a traction load, such a load results in an elongation that is variable depending on the amount of the load according to a function identified by a particular load-elongation curve. The mechanical behavior depends on the material of the wire(s) and/or yarn(s) used, on the number of such wires/yarns, on their diameter or linear density and on the possible twisting pitch.

The expression "unravelling" of a reinforcing cord is used to indicate the tendency of single wires and/or yarns of the reinforcing cord not to remain stably woven when the reinforcing cord is subjected to cutting with a cutter. The unravelling is evaluated with the method BISFA E3 (The International Bureau For The Standardization Of Man-Made Fibres, Internationally Agreed Methods For Testing Steel Tyre Cords, 1995 edition).

The term "high performance tyres" is used to indicate tyres which are typically intended to be used in wheels of high and ultra-high-performance automobiles. Such tyres are commonly defined as "HP" or "UHP" and allow speeds of over 200 km/h, up to more than 300 km/h, to be reached. Examples of such tyres are those belonging to classes "T", "U", "H", "V", "Z", "W", "Y", according to the E.T.R.T.O.-(European Tyre and Rim Technical Organisation) standard and racing tyres, in particular for high piston displacement four-wheeled vehicles. Typically, tyres belonging to such classes have section width equal to or greater than 185 mm, preferably comprised between 195 mm and 385 mm, more preferably comprised between 195 mm and 355 mm. Such tyres are preferably mounted on rims having fitting diameters equal to or greater than 13 inches, preferably not greater than 24 inches, more preferably comprised between 16 inches and 23 inches. Such tyres can also be used in vehicles different from the aforementioned automobiles, for example in high-performance sports motorcycles, i.e. motorcycles capable of reaching speeds even over 270 km/h. Such motorcycles are those that belong to the category typically identified with the following classifications: hypersport, supersport, sport touring, and for lower speed rating: scooter, road enduro and custom.

The term "tyre for motorcycle wheels" is used to indicate a tyre having a high curvature ratio (typically more than 0.200), capable of reaching high camber angles when the motorcycle is cornering.

Hereinafter, when reference is made to automobile tyres both tyres for cars, like for example the high performance tyres defined above, and tyres for light load vehicles, for example trucks, vans, campervans, pick-up trucks, typically with a total mass at full load equal to or lower than 3500 Kg, are intended.

The term "radial carcass structure" is used to indicate a carcass structure comprising a plurality of reinforcing cords, each of which being oriented along a substantially axial direction. Such reinforcing cords can be incorporated in a single carcass layer or in a plurality of carcass layers (preferably two) radially juxtaposed over one another.

The term "crossed belt structure" is used to indicate a belt structure comprising a first belt layer including reinforcing cords substantially parallel to one another and inclined with respect to the equatorial plane of the tyre by a predetermined angle and at least one second belt layer arranged in a radially outer position with respect to the first belt layer and including reinforcing cords substantially parallel to one another and oriented with an inclination opposite to the one of the cords of the first layer with respect to the equatorial plane of the tyre.

The term "zero degrees belt layer" is used to indicate a reinforcing layer comprising at least one reinforcing cord wound on the belt structure according to a substantially circumferential winding direction.

In order to keep down the emissions of $CO_2$ into the atmosphere, the Applicant has been producing for many years tyres for automobile and motorcycle wheels having a low rolling resistance. Such tyres comprise, in the respective crossed belt structures, and/or in the bead reinforcing structures indicated below with "chafer" and "flipper", metallic reinforcing cords comprising particularly light steel wires, for example having a diameter equal to 0.22 mm, 0.20 mm or 0.175 mm.

The choice of the Applicant to use in the aforementioned structural components of the tyre reinforcing cords comprising only steel wires derives from the fact that the steel wires, having a high rigidity and an excellent resistance to fatigue, are capable of providing the reinforcing cord, and thus the aforementioned structural components of the tyre, with a high resistance to the high compressive or bending stresses to which such structural components are typically subjected during travel of the vehicle on which the tyre is mounted. Moreover, thanks to the high heat conduction capability of steel, the steel wires have high thermal stability, providing the reinforcing cord with a stable mechanical behavior even in extreme conditions of use, like those typical of high performance tyres.

The Applicant has also observed that steel ensures good adhesion of the reinforcing cord to the surrounding elastomeric material, with consequent advantages in terms of quality of the tyre.

However, the Applicant observed that in order to avoid risks of corrosion of the steel in the case of leakage of water inside the tyre and, at the same time, to maximize the adhesion between steel and elastomeric material, it is advisable to ensure that, at each cross section of the reinforcing cord and, therefore, along the entire longitudinal extension of the reinforcing cord, the elastomeric material surrounds as completely as possible each steel wire. In the case of reinforcing cords comprising a plurality of steel wires twisted together, it is also advisable for the elastomeric material to penetrate as much as possible into the space defined between the aforementioned wires. This is in order to avoid having zones of possible mutual contact of the steel wires, which would actually constitute zones of possible formation of cracks due to fatigue from fretting, at the expense of the structural integrity of the tyre.

The Applicant has also observed that steel wires, having a low part load elongation, are not suitable for being used in those structural components of the tyre where a high part load elongation is desired, like for example in the zero degrees belt layers of the tyre for automobiles or motorcycles. In such structural components it is deemed preferable to use textile reinforcing cords having a low modulus, like for example reinforcing cords made of nylon or, in the cases in which a high rigidity is also required at high loads (and thus a high modulus at high loads), mixed textile reinforcing cords or hybrid reinforcing cords.

With particular reference to mixed textile reinforcing cords and hybrid reinforcing cords, they make it possible to obtain the desired part load elongation and the desired rigidity thanks to their characteristic "double modulus" mechanical behavior obtained through the use of a material having a low modulus and a material having a high modulus. At low loads, the mechanical behavior of the reinforcing cord is mainly dictated by the reaction offered by the material having low modulus, whereas at high loads the mechanical behavior of the reinforcing cord is mainly dictated by the reaction offered by the material having high modulus. Such types of reinforcing cords therefore have a mechanical behavior that translates, in a load-elongation graph, by a curve defined by two segments separated by a joining knee, wherein the segment on the left of the knee (indicative of the part load elongations) has a much lower inclination with respect to the horizontal axis than that of the segment on the right of the knee (indicative of the rigidity).

The Applicant has however observed that the textile and hybrid reinforcing cords, unlike the metallic ones, do not allow adequate adhesion of the surrounding elastomeric material. Therefore, it is necessary to coat them with adhesive substances or subject them to specific chemical or physical adhesive-fixing treatments.

The Applicant has thought that it would be desirable to also use metallic reinforcing cords in those structural components of the tyre where, in order to be able to obtain a high part load elongation, textile or hybrid reinforcing cords are currently used. Indeed, it would be possible in this case to also obtain in the aforementioned structural components the desired adhesion between reinforcing cord and surrounding elastomeric material without the need to apply an adhesive coating to the reinforcing cord or to subject it to adhesion-fixing treatments.

The Applicant has also thought that it would be desirable for the aforementioned metallic reinforcing cords to also allow an adequate penetration of the elastomeric material between the various metallic wires, so as to maximize the adhesion between reinforcing cord and elastomeric material and avoid both risks of corrosion caused by leakages of water inside the tyre, and risks of fretting of the metallic wires.

According to the Applicant, moreover, an adequate penetration of the elastomeric material between the metallic wires would result in a more homogeneous thermodynamic and hysteresis behavior of the structural component of the tyre, with consequent reduction of the risks of formation of cracks inside the structural component at the transition zones between metallic wires and elastomeric material.

The Applicant has achieved all of the goals discussed above by manufacturing metallic reinforcing cords having constructions such as to provide the metallic reinforcing cord with a part load elongation greater than or equal to 1%, all of these constructions being defined by twisting together at least two metallic wires with a predetermined twisting pitch, such metallic wires possibly being twisted with one or more further single metallic wires, i.e. such further single metallic wires are not twisted together to define strands of metallic wires.

The present invention therefore relates to a metallic reinforcing cord for tyres for vehicle wheels, comprising:
a) a plurality of metallic wires twisted to one another with a single twisting pitch, or
b) a single metallic wire twisted with at least one second metallic wire with a single twisting pitch, or
c) a plurality of first metallic wires twisted to one another with a first twisting pitch to define a first strand of metallic wires and at least one second metallic wire twisted with said first strand of metallic wires with a second twisting pitch equal to or different from the first twisting pitch.

Preferably, the metallic reinforcing cord has a part load elongation greater than or equal to 1%, more preferably greater than 2%, even more preferably greater than 3%, even more preferably greater than 3.5%, even more preferably greater than 4%.

According to the Applicant, metallic reinforcing cords of the type described above are suitable for both allowing the desired penetration of the elastomeric material and for achieving a high elongation when subjected to loads, even small loads.

The Applicant has found that the aforementioned metallic reinforcing cords have, at low loads, a mechanical behavior that is comparable to that of the textile reinforcing cords having a low modulus (thus obtaining the desired part load elongation) and, at high loads, a mechanical behavior that is comparable to that of metallic reinforcing cords (thus obtaining a high rigidity). The high part load elongation is a consequence of the stretching of the helix defined in the metallic reinforcing cord by the twisting of the metallic wires (in this case the reinforcing cord behaves like a spring), whereas the high rigidity at high loads is a consequence of the high elastic modulus which is typical of the metallic material.

The elastomeric material arranged between the metallic wires also tends to behave like a structural component of the reinforcing cord and thus to also provide a contribution in terms of rigidity.

In practice, the metallic reinforcing cords of the invention have a "double modulus" mechanical behavior which is comparable to the one which is typical of mixed and hybrid textile reinforcing cords. It is therefore possible to use the aforementioned metallic reinforcing cords both in all of the structural components of the tyre in which metallic reinforcing cords are typically used and in all of the structural components of the tyre in which mixed and hybrid textile reinforcing cords are typically used, thus achieving all of the advantages discussed above in connection with the use of metallic reinforcing cords (in particular: fatigue resistance, thermostability and adhesion).

Such a metallic reinforcing cord has, in addition to all the advantageous features which are typical of metallic reinforcing cords (rigidity at high loads, fatigue resistance, thermostability and adhesion to the elastomeric material), a high penetration of the elastomeric material inside the same and a high part load elongation.

Depending on the particular application it is possible to select the one among the aforementioned constructions of the metallic reinforcing cord that is deemed most suitable. Once the construction of interest has been selected, the specific geometry of the metallic reinforcing cord of the invention can be selected by changing the twisting pitch of the metallic wires or the diameter of the metallic wires or the number of metallic wires.

For example, by changing the twisting pitch of the metallic wires and/or their diameter it is possible to increase the amount of elastomeric material incorporated between the metallic wires and more evenly distribute the metallic wires in a piece of structural component of predetermined thickness, thus achieving an increased rigidity of such a structural component and a better transmission of the stresses borne by such a structural component during the use of the tyre, to the benefit of responsiveness.

Depending on the particular construction and/or geometry which is selected the reinforcing cord can be more suitable for being used in some structural components of the tyre with respect to other structural components of the tyre. For example, it is possible to provide for a construction and/or geometry adapted to maximize the rigidity, and/or the breaking load and/or the penetration of the elastomeric material inside the space defined between the various metallic wires, or a different construction and/or geometry adapted to maximize the part load elongation and/or the elongation at break.

According to the Applicant, it is preferable to maximize the rigidity and/or the breaking load and/or the penetration when using the metallic reinforcing cord in the crossed belt structures of tyres for automobile wheels, or in the reinforcing structures of the bead, indicated below with "chafer" and "flipper", of tyres for automobile or motorcycle wheels, or in the carcass structures of tyres for motorcycle wheels, whereas it is preferable to maximize the part load elongation and/or the elongation at break when using the metallic reinforcing cord in the zero degrees belt layers of tyres for automobile and motorcycle wheels.

The Applicant believes that it may be advantageous to maximize the part load elongation also in the carcass structures of tyres, in order to increase the penetration of the elastomeric material inside the reinforcing cords.

The Applicant believes that, for example:
  in order to maximize the rigidity and/or the breaking load it is possible to increase the number and/or the diameter of the metallic wires;
  in order to maximize the penetration it is possible to increase the twisting pitch of the metallic wires, while keeping the other parameters unchanged;
  in order to maximize the part load elongation and/or the elongation at break it is possible to reduce the twisting pitch of the metallic wires, while keeping the other parameters unchanged.

An advantageous effect linked to the high penetration of the elastomeric material between the metallic wires of the metallic reinforcing cord of the invention, and therefore to the greater uniformity of distribution of the metallic wires in the structural component of the tyre, is that the twisting pitch of the metallic wires can be increased with no risk that unravelling occurs. This allows an increase in the amount of metallic reinforcing cord produced in a predetermined time period to be achieved (hereinafter such a feature is also indicated as "machine output"), with consequent economic and production advantages.

The present invention can have at least one of the preferred features described hereinafter. Such features can therefore be present singularly or in combination with each other, except when expressly stated otherwise.

Preferably, said at least two metallic wires are made of steel. Such steel wires may or may not have the same carbon content.

In a first preferred embodiment, the metallic reinforcing cord comprises a plurality of metallic wires twisted only to one another with a single twisting pitch.

In a second preferred embodiment, the metallic reinforcing cord comprises a single metallic wire twisted only with at least one second metallic wire with a single twisting pitch.

In a third preferred embodiment, the metallic reinforcing cord comprises a plurality of first metallic wires twisted to one another with a first twisting pitch to define a first strand of metallic wires and at least one second metallic wire twisted only with said first strand of metallic wires with a second twisting pitch equal to or different from the first twisting pitch.

In all of the preferred embodiments, therefore, there are no metallic wires twisted together that are subsequently twisted with other metallic wires twisted together. In other words, there is no strand of metallic wires twisted together with another, or with other, strand(s) of metallic wires.

Preferably, in the cases in which the metallic reinforcing cord comprises a plurality of metallic wires twisted to one another with a single twisting pitch, the number of said metallic wires is lower than 6, more preferably equal to 2, or 3, or 4, or 5, or 6.

In the cases in which the metallic reinforcing cord comprises a single metallic wire twisted with at least one second metallic wire with a single twisting pitch, said single metallic wire can be substantially straight.

In the cases in which the metallic reinforcing cord comprises a first strand of metallic wires and at least one second metallic wire twisted with said first strand of metallic wires with said second twisting pitch, said first strand of metallic wires preferably comprises a number of metallic wires equal to or lower than 6, preferably equal to 2, or 3, or 4, or 5, or 6.

The aforementioned single metallic wire or the aforementioned first strand of metallic wires can be twisted with a single second metallic wire or with a plurality of second metallic wires.

In this last case, preferably, the number of second metallic wires is equal to or lower than 7, more preferably equal to 2, or 3, or 4, or 5, or 6, or 7.

The number of second metallic wires can be equal to or different from the number of metallic wires of the first strand of metallic wires.

All of the metallic wires of the metallic reinforcing cord may or may not have the same diameter.

Preferably, when the metallic reinforcing cord comprises a plurality of metallic wires twisted to one another with a single twisting pitch, such metallic wires all have the same diameter.

Preferably, when the metallic reinforcing cord comprises a plurality of first metallic wires twisted to one another with a first twisting pitch to define a first strand of metallic wires, all of the metallic wires of said first strand of metallic wires have the same diameter.

The diameter of the metallic wires of said first strand of metallic wires can be equal to or different from the diameter of the second metallic wire(s).

Preferably, said single twisting pitch, said first twisting pitch, or said second twisting pitch is greater than, or equal to, 1 mm, more preferably greater than, or equal to, 3 mm.

Preferably, the metallic reinforcing cord has an elongation at break greater than, or equal to, 4.5%, more preferably greater than, or equal to, 6%.

It is possible to actuate solutions suitable for ensuring that in any cross section of the metallic reinforcing cord said at least two metallic wires are spaced apart from one another.

Such solutions consist, preferably, of suitably deforming (or preforming or crimping) the metallic reinforcing cord until all of the metallic wires are spaced apart from one another along the entire longitudinal extension of the reinforcing cord. Such a deformation (or preforming or crimping) can be obtained by providing the metallic reinforcing cord with very high curvatures through passage of the reinforcing cord over a plurality of cylinders having a reduced diameter (for example comprised between 1 and 5 mm) with a predetermined pull.

In some embodiments, therefore, deforming the metallic reinforcing cord comprises pulling said metallic reinforcing cord by a traction force that is constant or variable over time.

It is possible in this way to adjust as desired the relative spacing of the various metallic wires and, therefore, their distribution in a predetermined piece of structural component of the tyre.

As the spacing between the various metallic wires changes, both the penetration of the elastomeric material in the metallic reinforcing cord and the rigidity of the metallic reinforcing cord change.

DESCRIPTION OF THE FIGURES

Further features and advantages of the present invention will become clearer from the following detailed description of a preferred embodiment thereof, made with reference to the attached drawings.

In such drawings:

FIG. 14 shows a segment of a further embodiment of metallic reinforcing cords made in accordance with the present invention.

DETAILED DESCRIPTION OF EMBODIMENTS OF THE INVENTION

Figure 1:
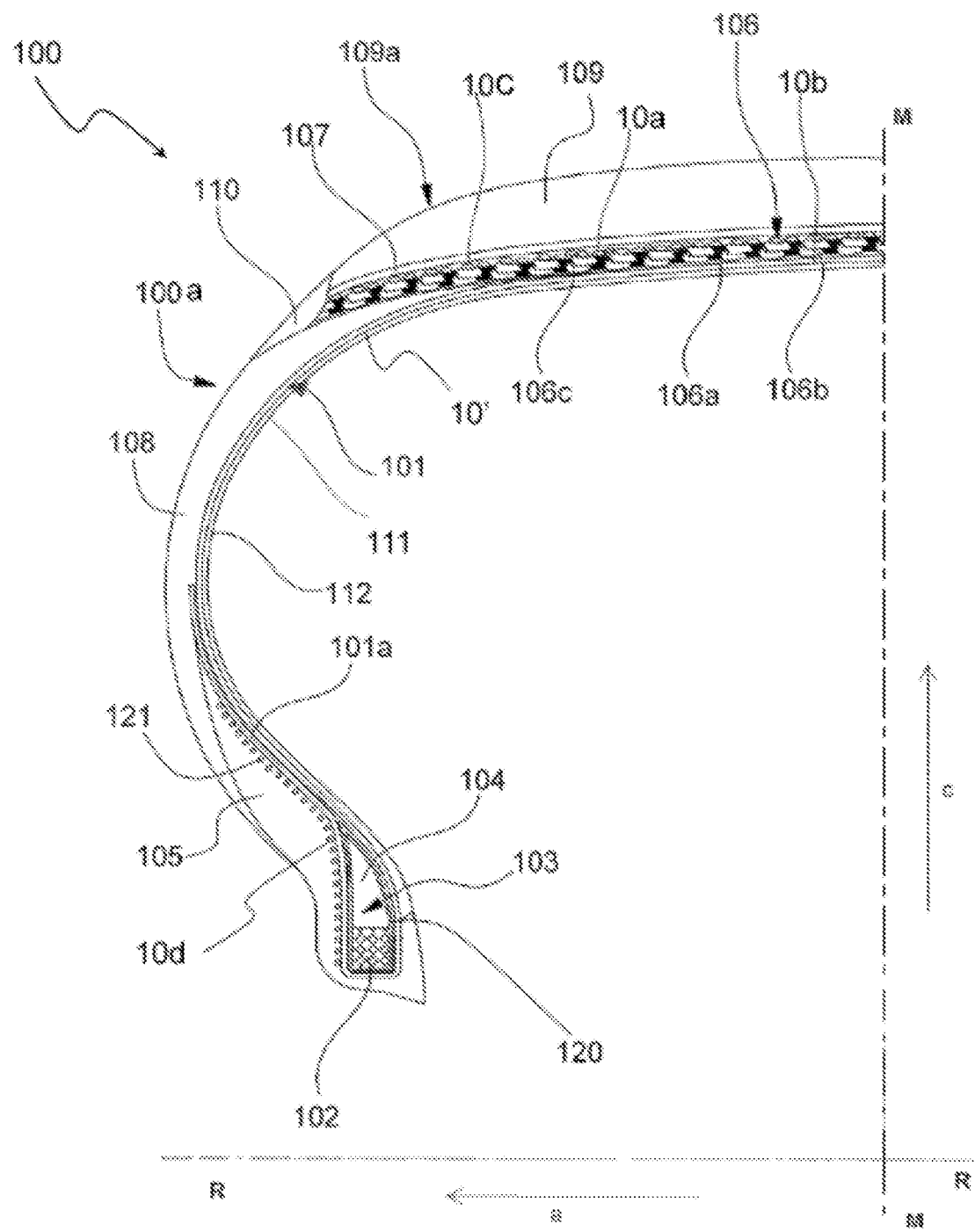
FIG. 1 is a schematic partial half cross-section view of a portion of a possible embodiment of a tyre in which a metallic reinforcing cord in accordance with the present invention can be used.

For the sake of simplicity, FIG. 1 shows only part of an embodiment of a tyre 100 produced with the method and the apparatus of the present invention, the remaining part, which is not shown, being substantially identical and being arranged symmetrically with respect to the equatorial plane M-M of the tyre.

The tyre 100 shown in FIG. 1 is, in particular, a tyre for four-wheeled vehicles.

Preferably, the tyre 100 is a HP or UHP tyre for sports and/or high or ultra-high-performance automobiles.

In FIG. 1 "a" indicates an axial direction, "c" indicates a radial direction, "M-M" indicates the equatorial plane of the tyre 100 and "R-R" indicates the rotation axis of the tyre 100.

The tyre 100 comprises at least one support structure 100a and, in a radially outer position with respect to the support structure 100a, a tread band 109 made of elastomeric material.

The support structure 100a comprises a carcass structure 101, which comprises at least one carcass layer 111.

Hereinafter, for the sake of simplicity of description, reference will be made to an embodiment of the tyre 100 comprising a single carcass layer 111, being nevertheless understood that what is described has analogous application in tyres comprising more than one carcass layer.

The carcass layer 111 has axially opposite end edges engaged with respective annular anchoring structures 102, called bead cores, possibly associated with an elastomeric filler 104. The zone of the tyre 100 comprising the bead core 102 and the possible elastomeric filler 104 forms an annular reinforcing structure 103 called "bead structure" and intended to allow the anchoring of the tyre 100 on a corresponding mounting rim, not shown.

The carcass layer 111 comprises a plurality of reinforcing cords 10' coated with an elastomeric material or incorporated in a matrix of cross-linked elastomeric material.

The carcass structure 101 is of the radial type, i.e. the reinforcing cords 10' are on planes comprising the rotation axis R-R of the tyre 100 and substantially perpendicular to the equatorial plane M-M of the tyre 100.

Each annular reinforcing structure 103 is associated with the carcass structure 101 by folding back (or turning) the opposite end edges of the at least one carcass layer 111 about the bead core 102 and the possible elastomeric filler 104, so as to form the so-called turnings 101a of the carcass structure 101.

In an embodiment, the coupling between carcass structure 101 and annular reinforcing structure 103 can be made through a second carcass layer (not shown in FIG. 1) which is applied in a radially outer position with respect to the carcass layer 111.

An anti-abrasion strip 105 is arranged at each annular reinforcing structure 103 so as to wrap around the annular reinforcing structure 103 along the axially inner, axially outer and radially inner zones of the annular reinforcing structure 103, thus being arranged between the latter and the rim of the wheel when the tyre 100 is mounted on the rim. However, embodiments wherein such an anti-abrasion strip 105 is not provided are foreseen.

The support structure 100a comprises, in a radially outer position with respect to the carcass structure 101, a crossed belt structure 106 comprising at least two belt layers 106a, 106b arranged in radial juxtaposition with respect to one another.

The belt layers 106a, 106b respectively comprise a plurality of reinforcing cords 10a, 10b. Such reinforcing cords 10a, 10b have an inclined orientation with respect to the circumferential direction of the tyre 100, or to the equatorial plane M-M of the tyre 100, by an angle comprised between 15° and 45°, preferably between 20° and 40°. For example, such an angle is equal to 30°.

The support structure 100a can also comprise a further belt layer (not shown) arranged between the carcass structure 101 and the radially inner belt layer of the aforementioned belt layers 106a, 106b and comprising a plurality of reinforcing cords having an inclined orientation with respect to the circumferential direction of the tyre 100, or to the equatorial plane M-M of the tyre 100, by an angle equal to 90°.

The support structure 100a can also comprise a further belt layer (not shown) arranged in a radially outer position with respect to the radially outer belt layer of the aforementioned belt layers 106a, 106b and comprising a plurality of reinforcing cords having an inclined orientation with respect to the circumferential direction of the tyre 100, or to the equatorial plane M-M of the tyre 100, by an angle comprised between 20° and 70°.

The reinforcing cords 10a, 10b of a belt layer 106a, 106b are parallel to one another and have a crossed orientation with respect to the reinforcing cords of the other belt layer 106b, 106a.

In ultra-high-performance tyres, the belt structure 106 can be a turned crossed belt structure. Such a belt structure is made by arranging at least one belt layer on a support element and turning the opposite lateral end edges of said at least one belt layer. Preferably, a first belt layer is initially deposited on the support element, then the support element radially expands, then a second belt layer is deposited on the first belt layer and finally the opposite axial end edges of the first belt layer are turned on the second belt layer to at least partially cover the second belt layer, which is the radially outermost layer. In some cases, it is possible to deposit a third belt layer on the second belt layer. Advantageously, the turning of the axially opposite end edges of a belt layer on a radially outer belt layer imparts greater reactivity and responsiveness of the tyre when entering a bend.

The support structure 100a comprises, in a radially outer position with respect to the crossed belt structure 106, at least one zero degrees belt layer 106c, commonly known as "zero degrees belt". It comprises reinforcing cords 10c oriented along a substantially circumferential direction. Such reinforcing cords 10c thus form an angle of a few degrees (typically lower than 10°, for example comprised between 0° and 6°) with respect to the equatorial plane M-M of the tyre 100.

The tread band 109 is applied in a radially outer position with respect to the zero degrees belt layer 106c, like other semi-finished products which constitute the tyre 100.

Respective sidewalls 108 made of elastomeric material are also applied on the opposite lateral surfaces of the carcass structure 101, in an axially outer position with respect to the carcass structure 101 itself. Each sidewall 108 extends from one of the lateral edges of the tread band 109 up to the respective annular reinforcing structure 103.

The anti-abrasion strip 105, when provided, extends at least up to the respective sidewall 108.

In some specific embodiments, like the one shown and described herein, the rigidity of the sidewall 108 can be improved by providing a stiffening layer 120, generally known as "flipper" or additional strip-like insert, which has the function of increasing the rigidity and integrity of the annular reinforcing structure 103 and of the sidewall 108.

The flipper 120 is wound around a respective bead core 102 and the elastomeric filler 104 so as to at least partially surround the annular reinforcing structure 103. In particular, the flipper 120 wraps around the annular reinforcing structure 103 along the axially inner, axially outer and radially inner zones of the annular reinforcing structure 103.

The flipper 120 is arranged between the turned end edge of the carcass layer 111 and the respective annular reinforcing structure 103. Usually, the flipper 120 is in contact with the carcass layer 111 and the annular reinforcing structure 103.

In some specific embodiments, like the one shown and described herein, the bead structure 103 can also comprise a further stiffening layer 121 that is generally known with the term "chafer", or protective strip, and which has the function of increasing the rigidity and integrity of the annular reinforcing structure 103.

The chafer 121 is associated with a respective turned end edge of the carcass layer 111 in an axially outer position with respect to the respective annular reinforcing structure 103 and extends radially towards the sidewall 108 and the tread band 109.

The flipper 120 and the chafer 121 comprise reinforcing cords 10d (in the attached figures those of the chafer 121 cannot be seen) coated with an elastomeric material or incorporated in a matrix of cross-linked elastomeric material.

The tread band 109 has, in a radially outer position thereof, a rolling surface 109a intended to come into contact with the ground. The rolling surface 109a has circumferential grooves (not shown in FIG. 1) formed on it, which are connected by transversal notches (not shown in FIG. 1) so as to define a plurality of blocks of various shapes and sizes (not shown in FIG. 1) on the rolling surface 109a.

A sub-layer 107 is arranged between the zero degrees belt layer 106c and the tread band 109.

In some specific embodiments, like the one shown and described herein, a strip 110 consisting of elastomeric material, commonly known as "mini-sidewall", can possibly be provided in the connection zone between the sidewalls 108 and the tread band 109. The mini-sidewall 110 is generally obtained through co-extrusion with the tread band 109 and allows an improvement of the mechanical interaction between the tread band 109 and the sidewalls 108.

Preferably, an end portion of the sidewall 108 directly covers the lateral edge of the tread band 109.

In the case of tyres without an air chamber, a layer of elastomeric material 112, generally known as "liner", can also be provided in a radially inner position with respect to the carcass layer 111 to provide the necessary impermeability to the inflation air of the tyre 100.

Depending on the type of tyre 100, the reinforcing cords 10a, 10b, 10c, 10d can be metallic reinforcing cords 10 made in accordance with the present invention. Such metallic reinforcing cords 10 can also be used in the carcass structure or belt structure of tyres for motorcycle wheels.

Figure 2:
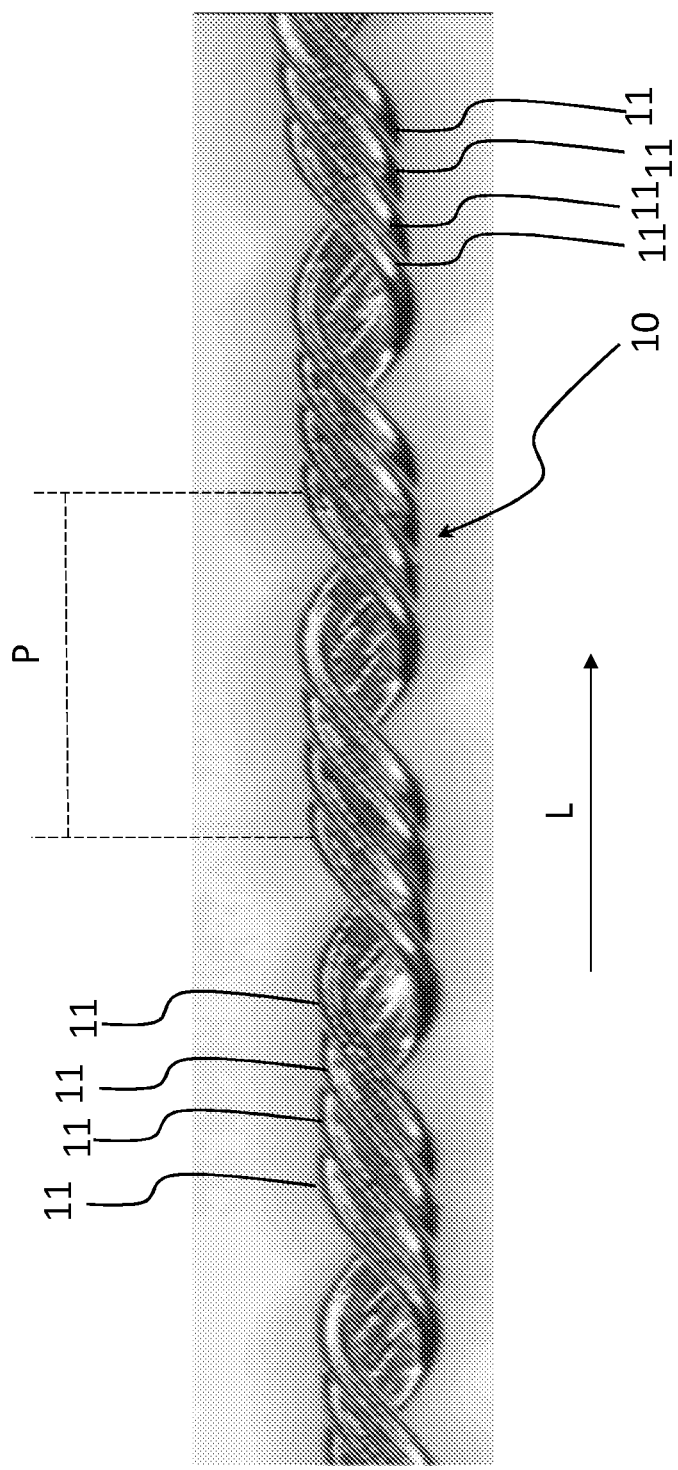
FIG. 2 is a photo of a segment of a first embodiment of a metallic reinforcing cord in accordance with the present invention.

An embodiment of a metallic reinforcing cord 10 made in accordance with the present invention is shown in FIG. 2.

With reference to such a figure, the metallic reinforcing cord 10 comprises a plurality of metallic wires 11 (four in the illustrated example) each extending along a longitudinal direction L according to a helical geometry defined by a respective helix having a predetermined winding pitch P. The metallic reinforcing cord 10 thus extends longitudinally along a helical path with the aforementioned predetermined winding pitch P.

Figure 3:
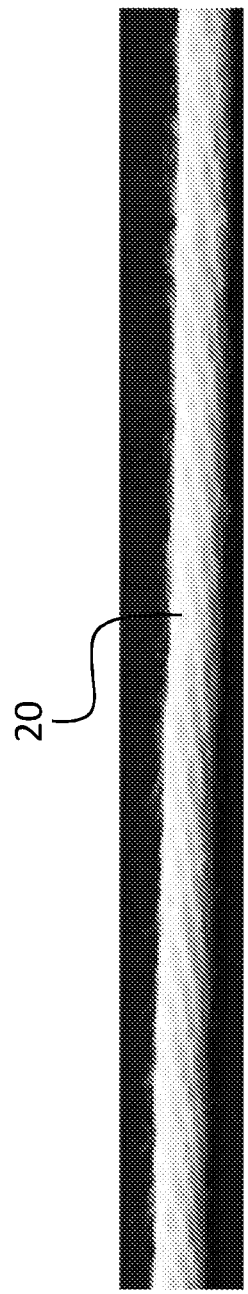
FIG. 3 is a photo of a textile yarn used to manufacture the metallic reinforcing cord of FIG. 2.
Figure 3A:
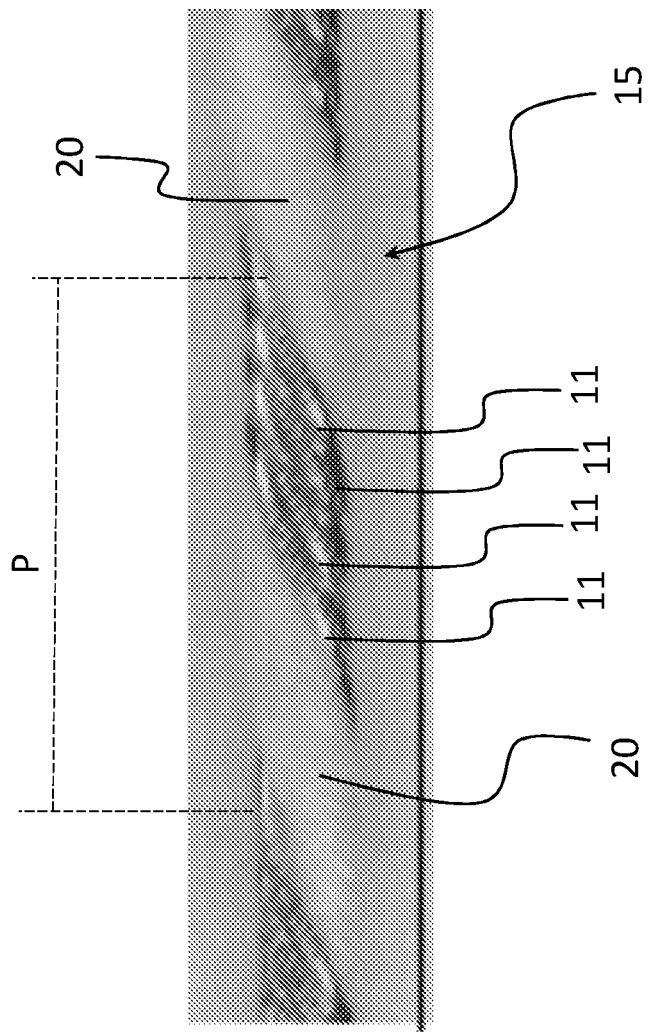
FIG. 3a is a photo of an elongated element used to manufacture the metallic reinforcing cord of FIG. 2 through the textile yarn of FIG. 3.

With reference to FIGS. 3 and 3a, the metallic reinforcing cord 10 of FIG. 2 is obtained by twisting together, in a conventional twisting machine (not shown in the figures), said plurality of wires 11 and a textile yarn 20 (for example of the type shown in FIG. 3) with a twisting pitch equal to the aforementioned winding pitch P, to make an elongated element 15 (for example of the type illustrated in FIG. 3a).

As will be described hereinafter with reference to FIGS. 4 and 5a, 5b, the textile yarn 20 is intended to be removed from the elongated element 15. After such removal, the metallic wires 11 keep the aforementioned helical geometry and define the metallic reinforcing cord 10, which will also have a helical geometry.

The metallic wires 11 are preferably all made of the same material, more preferably all made of steel. The metallic wires 11 can be wires made of NT (Normal Tensile) steel or wires made of HT (High Tensile) steel or wires made of ST (Super Tensile) steel or wires made of UT (Ultra Tensile) steel.

The metallic wires 11 have a carbon content lower than or equal to 1, preferably lower than or equal to 0.9%.

Preferably, the carbon content is greater than or equal to 0.7%.

In preferred embodiments, the carbon content is comprised between 0.7% and 1%, preferably between 0.7% and 0.9%.

The metallic wires 11 are typically coated with brass or another corrosion-resistant coating (for example Zn/Mn).

The metallic wires 11 have a diameter preferably greater than, or equal to, 0.04 mm, more preferably greater than, or equal to, 0.08 mm, even more preferably lower than, or equal to, 0.10 mm.

The metallic wires 11 have a diameter preferably lower than, or equal to 0.60 mm, more preferably lower than, or equal to, 0.45 mm.

In preferred embodiments, the metallic wires 11 have a diameter comprised between 0.04 mm and 0.60 mm, preferably between 0.08 mm and 0.45 mm, even more preferably between 0.10 mm and 0.45 mm.

For example, the metallic wires 11 have a diameter equal to: 0.10 mm, or 0.12 mm, or 0.13 mm, or 0.15 mm, or 0.175 mm, or 0.20 mm, or 0.22 mm, or 0.245 mm, or 0.25 mm, or 0.265 mm, or 0.27 mm, or 0.28 mm, or 0.30 mm, or 0.32 mm, or 0.35 mm, or 0.38 mm, or 0.40 mm, or 0.42 mm, or 0.45 mm.

Preferably, the metallic wires 11 all have the same diameter, but embodiments are foreseen in which the metallic wires 11 have different diameters.

The number of metallic wires 11 is preferably comprised between 2 and 27, more preferably between 2 and 25, even more preferably between 2 and 21.

The textile yarn 20 is preferably made of a water-soluble synthetic polymeric material, even more preferably a polyvinyl alcohol (PVA). Such a textile yarn 20 can be purchased from specialized producers, like for example Kuraray Co., Ltd or Sekisui Specialty Chemicals, or be made by twisting together a plurality of PVA filaments in a conventional twisting machine.

The textile yarn 20 has a diameter preferably greater than, or equal to, 0.15 mm, more preferably greater than, or equal to, 0.30 mm.

The textile yarn 20 has a diameter preferably lower than, or equal to, 2 mm, more preferably lower than, or equal to, 1 mm.

In preferred embodiments, the textile yarn 20 has a diameter comprised between 0.15 mm and 2 mm, preferably between 0.30 mm and 1 mm.

The textile yarn 20 has a linear density preferably greater than, or equal to, 200 dtex, more preferably greater than, or equal to, 700 dtex.

The textile yarn 20 has a linear density preferably lower than, or equal to, 4400 dtex, more preferably lower than, or equal to, 1670 dtex.

In preferred embodiments, the textile yarn 20 has a linear density comprised between 200 dtex and 4400 dtex, preferably between 700 dtex and 1670 dtex.

The elongated element 15 can comprise more than one textile yarn 20.

Each metallic wire 11 can be twisted on itself, in the same direction as, or in the opposite direction to, the direction in which it is twisted on the textile yarn 20.

The twisting pitch P of the metallic wires 11 is preferably greater than, or equal to, 2 mm, more preferably greater than, or equal to, 3 mm, even more preferably greater than, or equal to, 4 mm.

The twisting pitch P of the metallic wires 11 is preferably lower than, or equal to, 50 mm, more preferably lower than, or equal to, 25 mm.

In preferred embodiments, the twisting pitch P of the metallic wires 11 is comprised between 2 mm and 50 mm, preferably between 4 mm and 25 mm.

The arrangement of the metallic wires 11 about the textile yarn 20 is such that the metallic wires 11 do not completely wrap around the textile yarn 20. In particular, the metallic wires 11 are arranged around the textile yarn 20 so that, in any cross section of the elongated element 15, they are at only an angular portion of an ideal circumference that circumscribes the textile yarn 20. Such an angular portion is defined by an angle that is preferably greater than, or equal to, 15°, more preferably greater than, or equal to, 20°.

Preferably, such an angle is lower than, or equal to, 45°, more preferably lower than, or equal to, 30°.

In preferred embodiments such an angle is comprised between 15° and 45°, more preferably between 20° and 30°.

The metallic reinforcing cord 10 can be obtained from a plurality of elongated elements 15 twisted together.

The metallic wires 11 can be twisted together with the textile yarn 20 with the aforementioned twisting pitch P to form metallic reinforcing cords 10 having a construction of the n×D type, where n is the number of metallic wires 11 and D is the diameter of the metallic wires 11.

Examples of metallic reinforcing cords 10 having a construction of the n×D type are shown in FIGS. 2, 8-13.

The metallic reinforcing cord 10 of FIG. 2 has a 4×D construction, whereas the construction of the reinforcing cords of FIGS. 8-13 is indicated in the aforementioned figures.

Preferably, in the metallic reinforcing cords 10 having a construction of the n×D type, the number of metallic wires 11 is comprised between 2 and 7, more preferably between 2 and 6, even more preferably between 2 and 5. Preferably, all of the metallic wires 11 have the same diameter.

Alternatively, the metallic wires 11 can be twisted together so as to take up a geometry like the one shown in FIG. 14.

In the embodiment of FIG. 14, the metallic reinforcing cord 10 comprises a substantially straight first metallic wire 11a on which a second metallic wire 11b is wound in a helix with the aforementioned twisting pitch P. The metallic reinforcing cord of FIG. 14 therefore has a 1+1×D construction, where D is the diameter of the metallic wires 11a and 11b.

Preferably, in the metallic reinforcing cords having a 1+1×D construction, the metallic wires 11a and 11b have the same diameter, but embodiments are foreseen wherein the metallic wires 11a and 11b have different diameters.

Further embodiments are foreseen comprising a plurality of substantially parallel metallic wires 11a and a metallic wire 11b wound in a helix on such metallic wires 11a. Such metallic reinforcing cords 10 have a construction of the n+1×D type, where n is the number of metallic wires 11a and D is the diameter of the metallic wires 11a and 11b. Preferably, in the metallic reinforcing cords 10 having a construction of the n+1×D type the number of metallic wires 11a is comprised between 2 and 7, more preferably between 2 and 6.

Preferably, the metallic wires 11a have the same diameter, but embodiments are foreseen wherein the metallic wires 11a and 11b have different diameters.

Alternatively, it is possible to provide metallic reinforcing cords 10 comprising a single substantially straight metallic wire 11a and a plurality of metallic wires 11b wound in a helix on the aforementioned metallic wire 11a. Such metallic reinforcing cords 10 have a construction of the 1+n×D type, where n is the number of metallic wires 11b and D is the diameter of the metallic wires 11a and 11b.

Preferably, in the metallic reinforcing cords 10 having a construction of the 1+n×D type the number of metallic wires 11b is comprised between 2 and 7, more preferably between 2 and 6.

Preferably, the metallic wires 11b have the same diameter, but embodiments are foreseen wherein the metallic wires 11a and 11b have different diameters.

Figure 4:
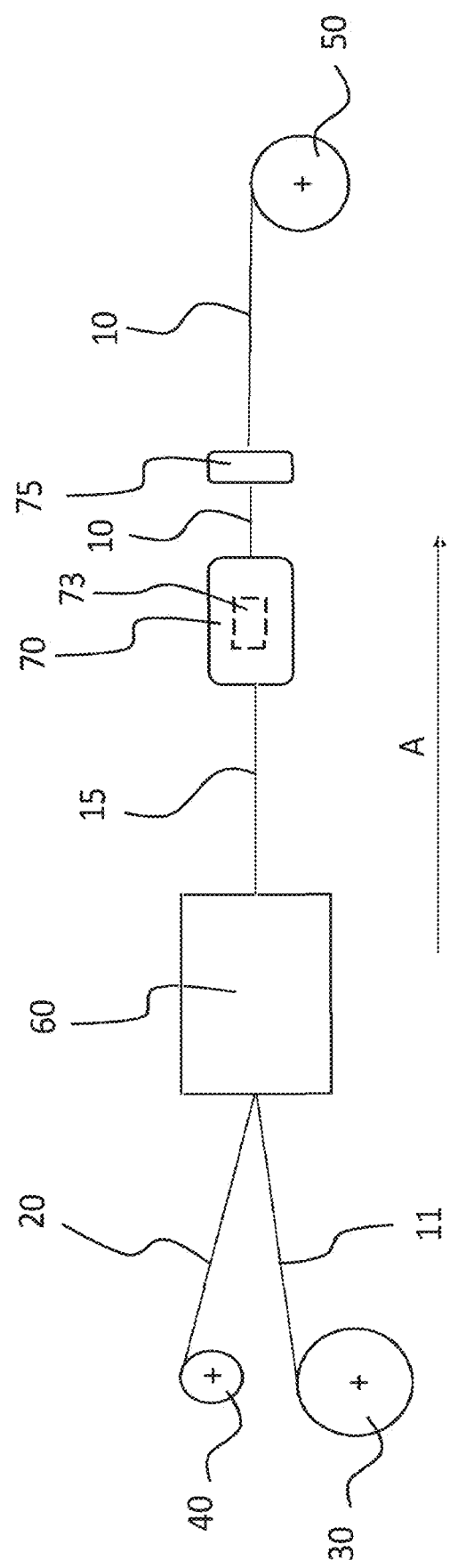
FIG. 4 is a schematic view of a first embodiment of an apparatus for manufacturing the metallic reinforcing cord in accordance with the present invention, such an apparatus carrying out a continuous process.

With reference to FIG. 4, an embodiment of an apparatus for manufacturing the metallic reinforcing cord 10 in accordance with the present invention and an embodiment of a process for manufacturing the metallic reinforcing cord 10 in accordance with the present invention are described. For the sake of simplicity of description, reference will be made to a metallic reinforcing cord 10 obtained from a single elongated element 15, the latter being obtained by twisting together two metallic wires 11 and a single textile yarn 20. For the sake of simplicity of illustration in FIG. 4 only one of the two metallic wires 11 is shown.

The textile yarn 20 and the metallic wires 11 are taken from respective reels 40 and 30 (the other reel 30 from which the other metallic wire 11 is taken is not visible) and fed to a twisting device 60 to be twisted together, so as to form the elongated element 15. The twisting device 60 is therefore arranged downstream of the reels 40 and 30 with respect to a feeding direction indicated with A in FIG. 4.

The elongated element 15 is fed, along said feeding direction A, to a removal device 70 in which the textile yarn 20 is removed from the elongated element 15, thus obtaining the metallic reinforcing cord 10. The removal device 70 is therefore arranged downstream of the twisting device 60 with respect to the feeding direction A.

In a preferred embodiment of the invention, the removal device 70 comprises a hot water jet feeding device 73 configured to feed a hot water jet against the elongated element 15, in a counter-current while the elongated element 15 moves along the feeding direction A. The hot water jet dissolves the textile yarn 20 while such a jet is crossed by the metallic wires 11, which remain the only constituent elements of the metallic reinforcing cord 10.

Preferably, the metallic reinforcing cord 10 thus formed then crosses a drying device 75 to be subsequently wound in a respective collection reel 50, from which it can be taken during the manufacture of the specific structural component of the tyre 100 of interest. The drying device 75 is therefore arranged downstream of the removal device 70 with respect to the feeding direction A.

In the process described above with reference to FIG. 4, the manufacturing of the metallic reinforcing cord 10 is carried out while obtaining the elongated element 15 (and while removing the textile yarn 20). The metallic reinforcing cord 10 is thus made through a continuous process that comprises, in a time sequence free of interruptions or stops, making the elongated element 15 by mutually twisting the metallic wires 11 and the textile yarn 20, moving the elongated element 15 thus made along the feeding direction A, removing the textile yarn 20, possibly drying the metallic reinforcing cord 10 thus formed and winding the metallic reinforcing cord 10 in the collection reel 50.

Figure 5:
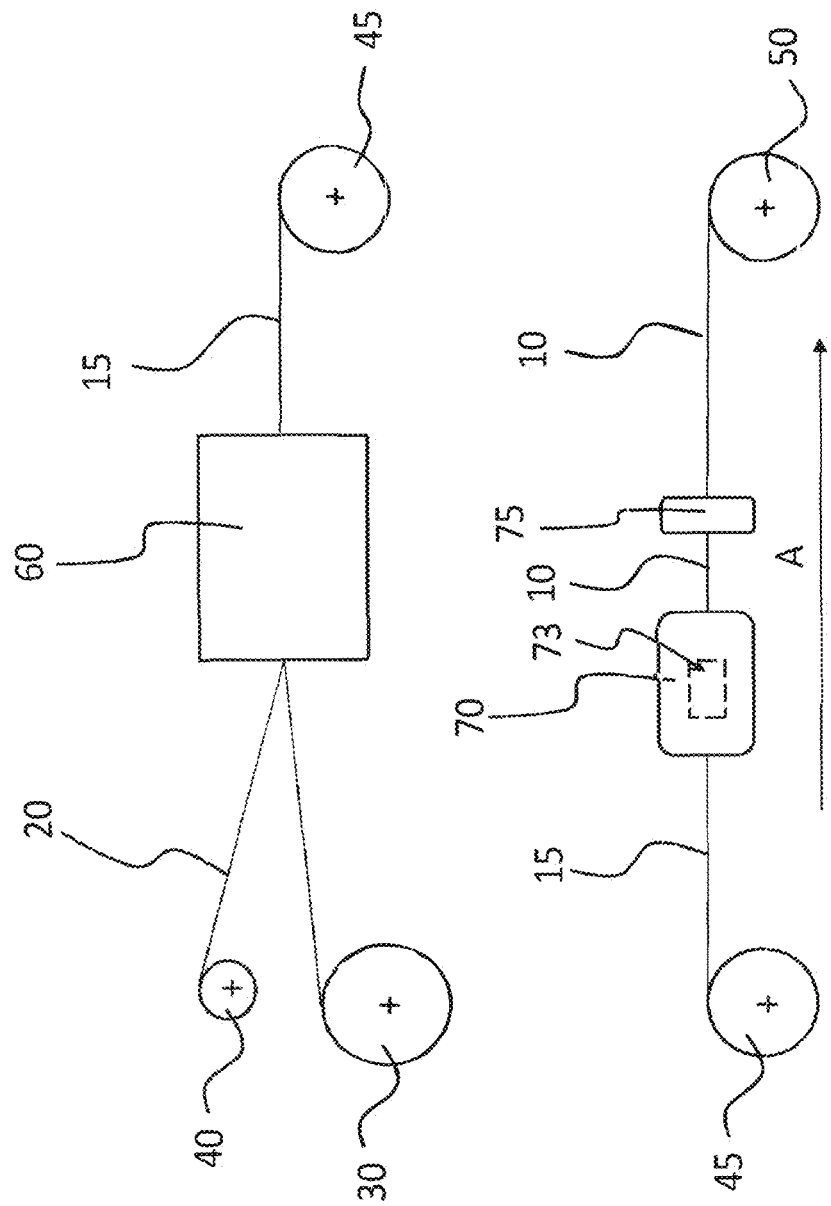
FIGS. 5a and 5b show a second embodiment of an apparatus for manufacturing the metallic reinforcing cord in accordance with the present invention, such an apparatus carrying out a discontinuous process.

However, it is possible to manufacture the metallic reinforcing cord 10 in two distinct operative steps, i.e. through a discontinuous process like for example the one shown in FIGS. 5*a*, 5*b*. Such a process differs from the one described above with reference to FIG. 4 only in that the elongated element 15, once made, is collected in a service reel 45 (FIG. 5*a*), from which it can be taken when desired to proceed with the manufacturing of the metallic reinforcing cord 10 as described earlier (FIG. 5*b*). The service reel 45 is thus intended to be arranged downstream of the twisting device 60 when the elongated element 15 is made and upstream of the removal device 70 when the textile yarn 20 is removed from the elongated element 15 to manufacture the metallic reinforcing cord 10.

The metallic reinforcing cords 10 are intended to be incorporated in a piece of elastomeric material through conventional calendering processes in conventional rubberizing machines to make the various structural components of the tyre 100 described above.

The metallic reinforcing cord 10 can be made with different helical geometries depending on the particular application (type of tyre of interest or structural component thereof of interest). The helical geometry can be changed by intervening on one or more of the following parameters: number of metallic wires 11, 11*a*, 11*b*, diameter of the metallic wires 11, 11*a*, 11*b*, diameter (or linear density) of the textile yarn 20 (i.e. number of filaments and/or ends of the textile yarn 20), twisting pitch P, number of textile yarns 20, degree of preforming in the twisting device 60 or in the rubberizing machine.

Depending on the predetermined helical geometry the metallic reinforcing cord 10 will have different mechanical behavior that translates, in a load-elongation graph, into a different curve. It is thus possible to manufacture metallic reinforcing cords 10 having different rigidities, breaking loads, elongations at break, penetrations and part load elongations.

Figure 6:
FIGS. 6 and 7 show some load-elongation graphs of conventional cords and of metallic reinforcing cords made in accordance with the present invention.

FIG. 6 shows, as an example, the load-elongation curves of five metallic reinforcing cords 10 made in accordance with the present invention and having different helical geometry:
 the reinforcing cord of the curve indicated with a has a construction (32)+2×0.30 HT;
 the reinforcing cord of the curve indicated with b has a construction (32)+4×0.30 HT;
 the reinforcing cord of the curve indicated with c has a construction (16)+6×0.14 HT;
 the reinforcing cord of the curve indicated with d has a construction (32)+4×0.14 HT;
 the reinforcing cord of the curve indicated with e has a construction (32)+6×0.14 HT.

In the aforementioned constructions the number in brackets indicates the number of ends twisted together to obtain the textile yarn 20 that will then be removed (such a number is thus indicative of the diameter of the textile yarn 20), the number after + indicates the number of metallic wires twisted together with the textile yarn 20, the number after x indicates the diameter of the metallic wires (in mm) and HT indicates the type of steel used.

FIG. 6 shows that it is possible to manufacture metallic reinforcing cords 10 having part load elongations even equal to 12% and elongations at break even equal to 15%. These values are much greater than those obtainable with conventional metallic reinforcing cords; the latter, indeed, typically have values of part load elongation not greater than 3% and values of elongation at break not greater than 5%, in the case of HE metallic reinforcing cords. It should also be noted that, for example, by increasing the number of ends in the textile yarn 20 (and therefore the diameter of the textile yarn 20) while keeping the other parameters unchanged, the part load elongation and the elongation at break increase, thus keeping the rigidity and the breaking load unchanged (comparison between curves c and e), whereas by decreasing the diameter of the metallic wires while keeping the other parameters unchanged, the part load elongation and the elongation at break increase, thus reducing the rigidity and the breaking load (comparison between curves b and d).

Figure 7:
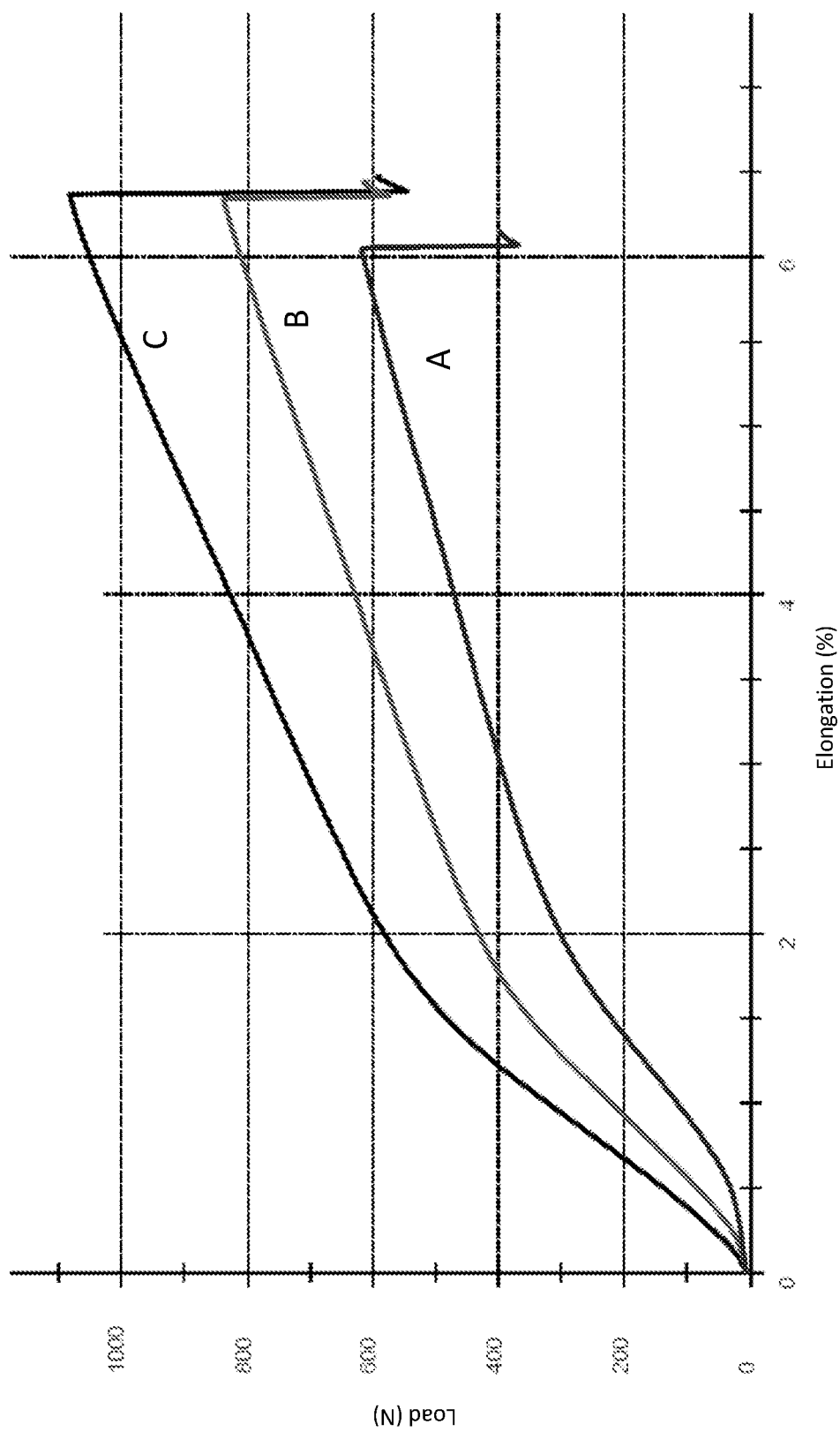

FIG. 7 shows, as an example, the load-elongation curves of further three metallic reinforcing cords having different helical geometries (curves A, B and C). The reinforcing cord of the curve indicated with A is a HE metallic reinforcing cord made by twisting together three metallic steel wires having a diameter equal to 0.35 mm and a textile yarn having 36 ends twisted together and subjected to conventional preforming systems, in particular of the permanent wave type. Such a cord thus has a construction (36)+3×0.35 HE. The reinforcing cord of the curve indicated with B is a HE metallic reinforcing cord having a construction (36)+4×0.35 HE; it differs from the one discussed above only in that it comprises four metallic wires. The reinforcing cord of the curve indicated with C is a HE metallic reinforcing cord having a construction (36)+5×0.35 HE; it differs from those discussed above only in that it comprises five metallic wires.

The graphs discussed above therefore confirm what has already been stated earlier, i.e. that by changing one or more among number of metallic wires 11, diameter of the metallic wires, diameter (or linear density) of the textile yarn 20 (i.e. number of filaments or ends of the textile yarn 20), twisting pitch P, number of textile yarns 20, it is possible to manufacture metallic reinforcing cords 10 having different helical geometries (or constructions), thus being able each time to manufacture a metallic reinforcing cord 10 having the mechanical behavior deemed most suitable for the tyre of interest or for the structural component of interest.

FIGS. 8-13 show, as examples, various metallic reinforcing cords 10 made in accordance with the present invention and respective conventional metallic reinforcing cords, indicated with STD. All of the illustrated reinforcing cords have a helical geometry, but such helical geometry is different depending on the specific construction of each of the illustrated reinforcing cords.

To the left of each of the illustrated reinforcing cords various cross sections of the reinforcing cord are shown and, to the left of such cross sections the specific construction of the metallic reinforcing cord is given. The twisting pitch in mm is indicated with P and the number of ends of the textile yarn 20 used to manufacture the illustrated metallic reinforcing cords 10 is in brackets.

Figure 8:
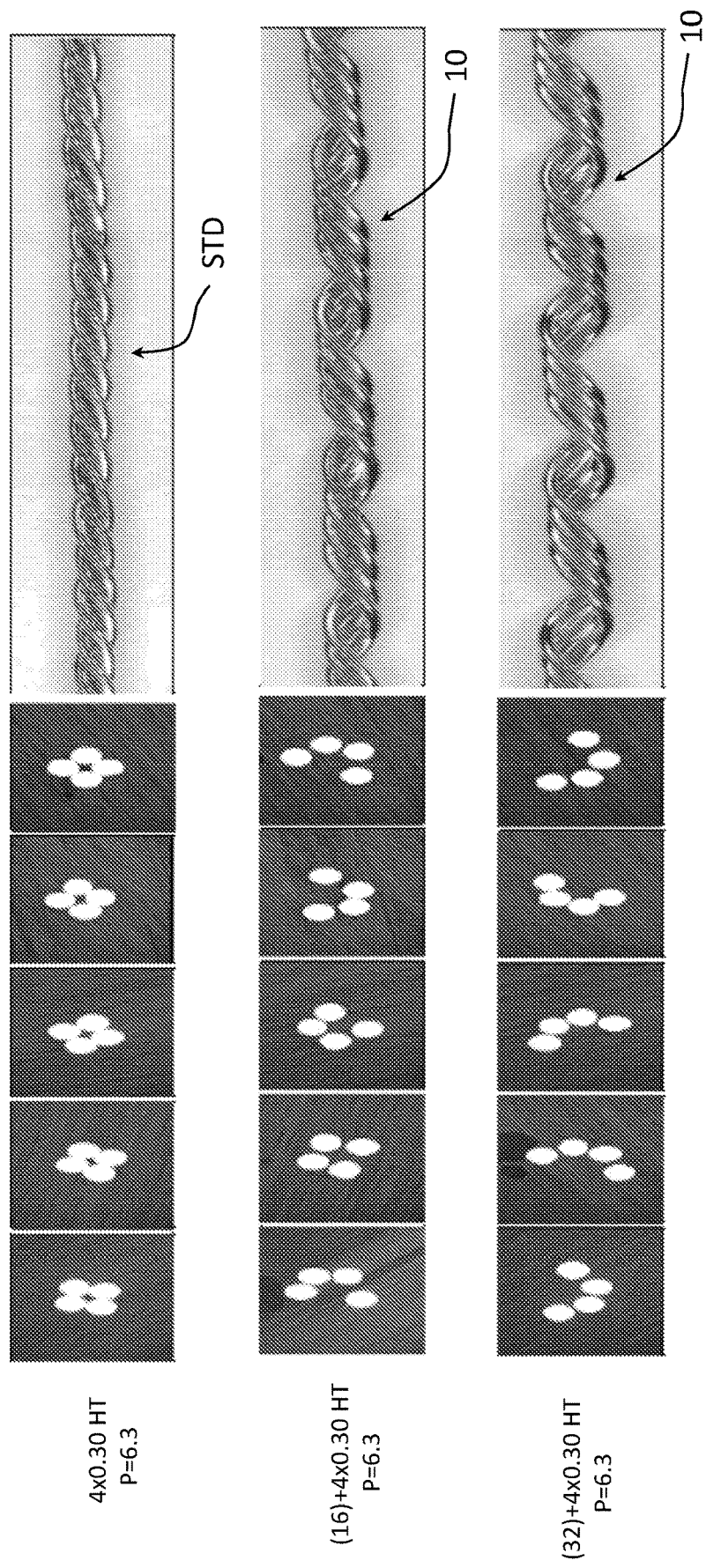
FIGS. 8-13 show various examples of metallic reinforcing cords made in accordance with the present invention and of conventional metallic reinforcing cords; some cross sections of each of the aforementioned reinforcing cords in a respective piece of elastomeric material are also illustrated.

The reinforcing cords shown in FIG. 8 comprise four HT steel wires having a diameter of 0.30 mm. All of these reinforcing cords have a geometry such that in some or all of their cross sections at least some of the steel wires are in a condition of substantial mutual contact (by this expression meaning both a condition of actual contact of two adjacent steel wires and a condition in which the distance between two adjacent steel wires is much lower than the diameter of the steel wires, in particular equal to or lower than half the diameter of the steel wires, even more in particular lower than one third of the diameter of the steel wires). The two metallic reinforcing cords 10 have a space, defined between the various steel wires and originally occupied by the textile yarn used to manufacture them, which is much greater than that of the conventional metallic reinforcing cord. Such a space increases, while keeping the other parameters unchanged, as the diameter of the textile yarn used increases (and thus as the number of filaments and/or ends of the textile yarn increase). Moving from top to bottom in FIG. 8 the penetration, the elongation at break and the part load elongation increase.

In accordance with the present invention, it is possible to manufacture metallic reinforcing cords 10 having helical geometries such that in all of their cross sections the metallic wires are in a condition of substantial mutual contact, or metallic reinforcing cords 10 having helical geometries such that in first cross sections of the metallic reinforcing cord 10 some or all of the metallic wires are in a condition of substantial mutual contact and in second cross sections of the metallic reinforcing cord 10 some or all of the metallic wires are spaced apart from one another.

The present invention also makes it possible to manufacture metallic reinforcing cords 10 having helical geometries such that in all of the cross sections of the metallic reinforcing cord 10 all of the metallic wires are spaced apart from one another.

The spacing of the metallic wires can be obtained by suitably deforming (or preforming) the metallic reinforcing cords 10 while they are pulled with a predetermined traction force, which can be constant or variable over time. Such a deformation (or preforming) can be obtained by passing the metallic reinforcing cord 10 over a plurality of cylinders having a reduced diameter (for example comprised between 1 and 5 mm) with a predetermined pull. Such deformation is minimum when cylinders of greater diameter are used and maximum when cylinders of smaller diameter are used.

Figure 9:
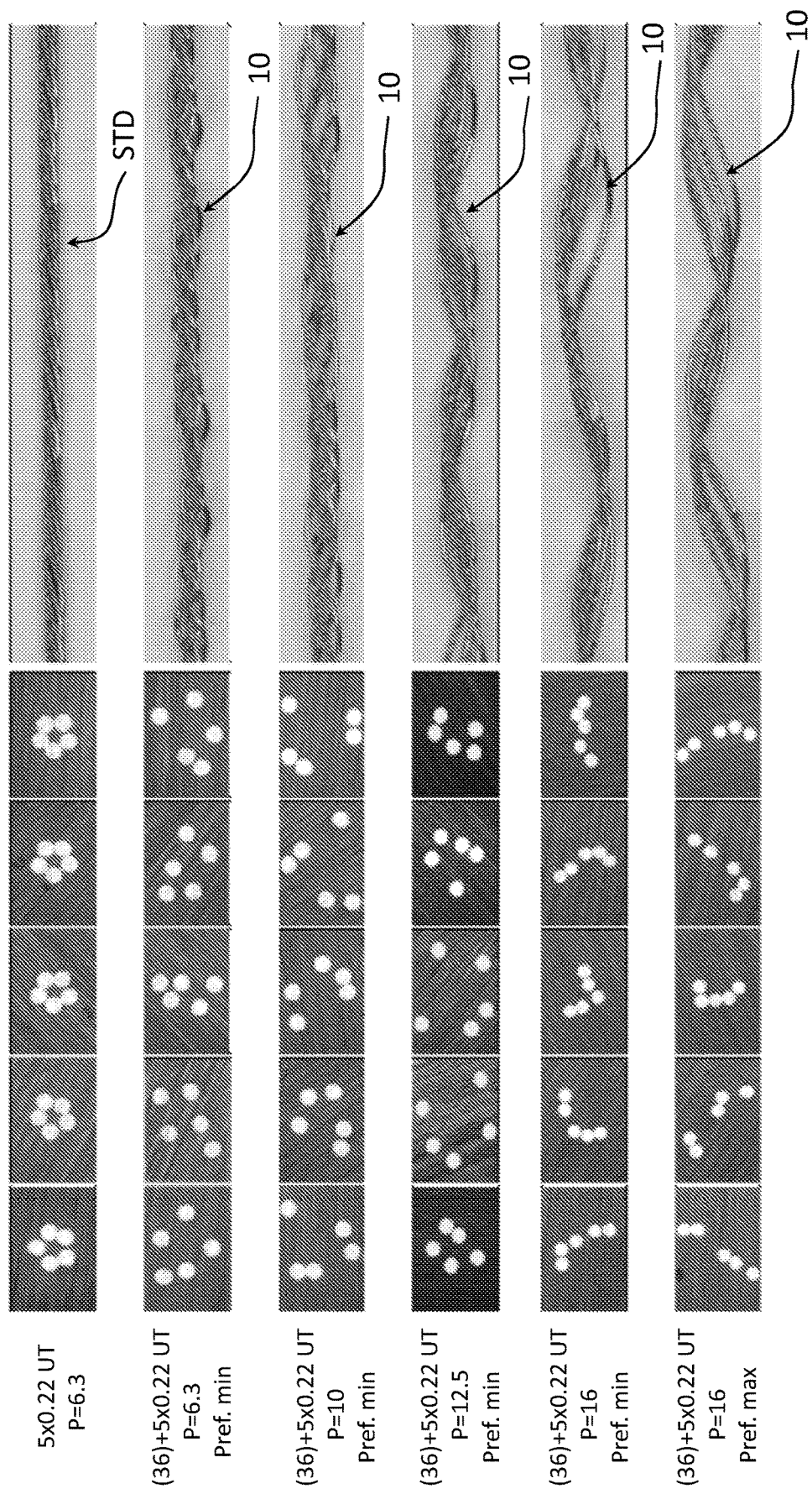

FIG. 9 shows a conventional metallic reinforcing cord (indicated with STD) and five metallic reinforcing cords 10 made in accordance with the present invention and subjected to suitable deformation so as to space all of the metallic wires from one another. The marking "pref." indicates the degree of deformation (minimum or maximum) to which the metallic reinforcing cord 10 has been subjected to have all of the metallic wires spaced apart from each other.

All of the reinforcing cords shown in FIG. 9 comprise five UT steel wires having a diameter equal to 0.22 mm.

It should be noted that, while keeping the other parameters unchanged, as the twisting pitch P increases the helical geometry of the metallic reinforcing cord 10 and the distribution of the metallic wires in a predetermined piece of elastomeric material change. In particular, unlike the conventional metallic reinforcing cord in which the metallic wires are collected together and concentrated substantially at the center of the aforementioned piece, in the metallic reinforcing cords 10 the metallic wires are distributed over the entire volume of the aforementioned piece.

It should also be noted that, while keeping the other parameters unchanged, the greater the deformation, the greater the distribution of the metallic wires over the entire volume of the piece of elastomeric material (comparison between the last two reinforcing cords at the bottom of FIG. 9). The degree of deformation imparted on the metallic reinforcing cord 10 can thus also be considered as a useful parameter on which to intervene to provide the metallic reinforcing cord 10 with the helical geometry (and therefore the mechanical behavior) deemed ideal for the particular application required.

The distribution of the metallic wires inside the aforementioned structural component can be changed by changing, over time, the amount of the traction force with which the metallic reinforcing cord 10 is pulled during the aforementioned deformation or during the process of incorporation of the metallic reinforcing cord 10 in the piece of elastomeric material to make the structural component of interest of the tyre.

In accordance with the present invention, since it is possible to have very large twisting pitches (for example equal to 35 mm) with no risk of unravelling, it is possible to manufacture very flat metallic reinforcing cords 10. This makes it possible to double, or more generally multiply, the number of metallic reinforcing cords provided in a specific portion of piece of structural component with respect to the case where conventional metallic reinforcing cords are used.

Figure 10:
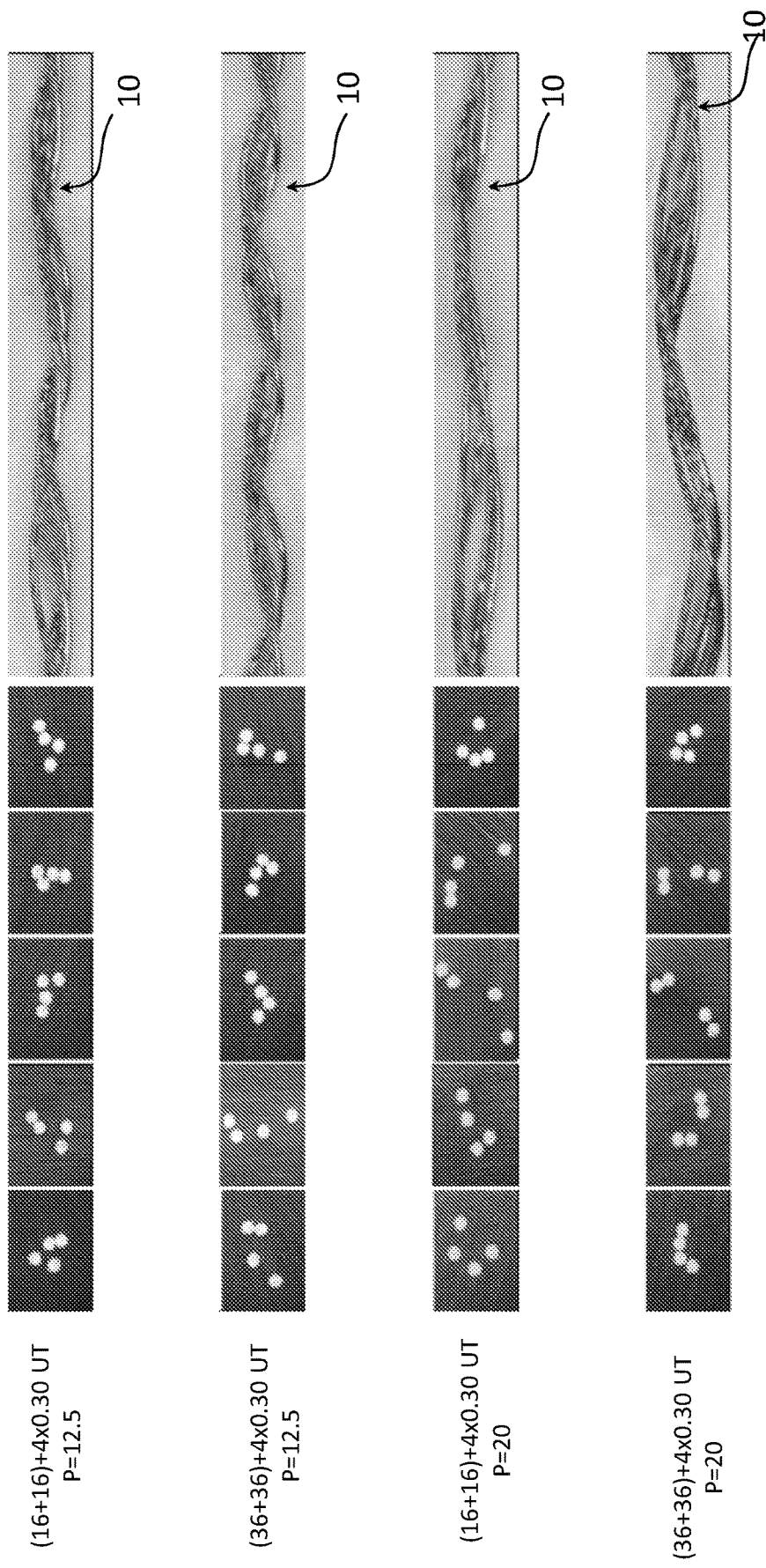

FIG. 10 shows four metallic reinforcing cords 10 made in accordance with the present invention. In order to manufacture each of such metallic reinforcing cords 10 two textile yarns were used, each comprising 16 ends twisted together (first and third cord in FIG. 10 moving from top to bottom) or 36 ends twisted together (second and fourth cord in FIG. 10 moving from top to bottom). The two textile yarns were twisted together with four UT steel wires having a diameter equal to 0.30 mm. It should be noted that as the number of ends of the textile yarn and the twisting pitch increase the metallic wires tend to be arranged almost parallel. In this case, the part load elongation is low but the machine output increases.

Figure 11:
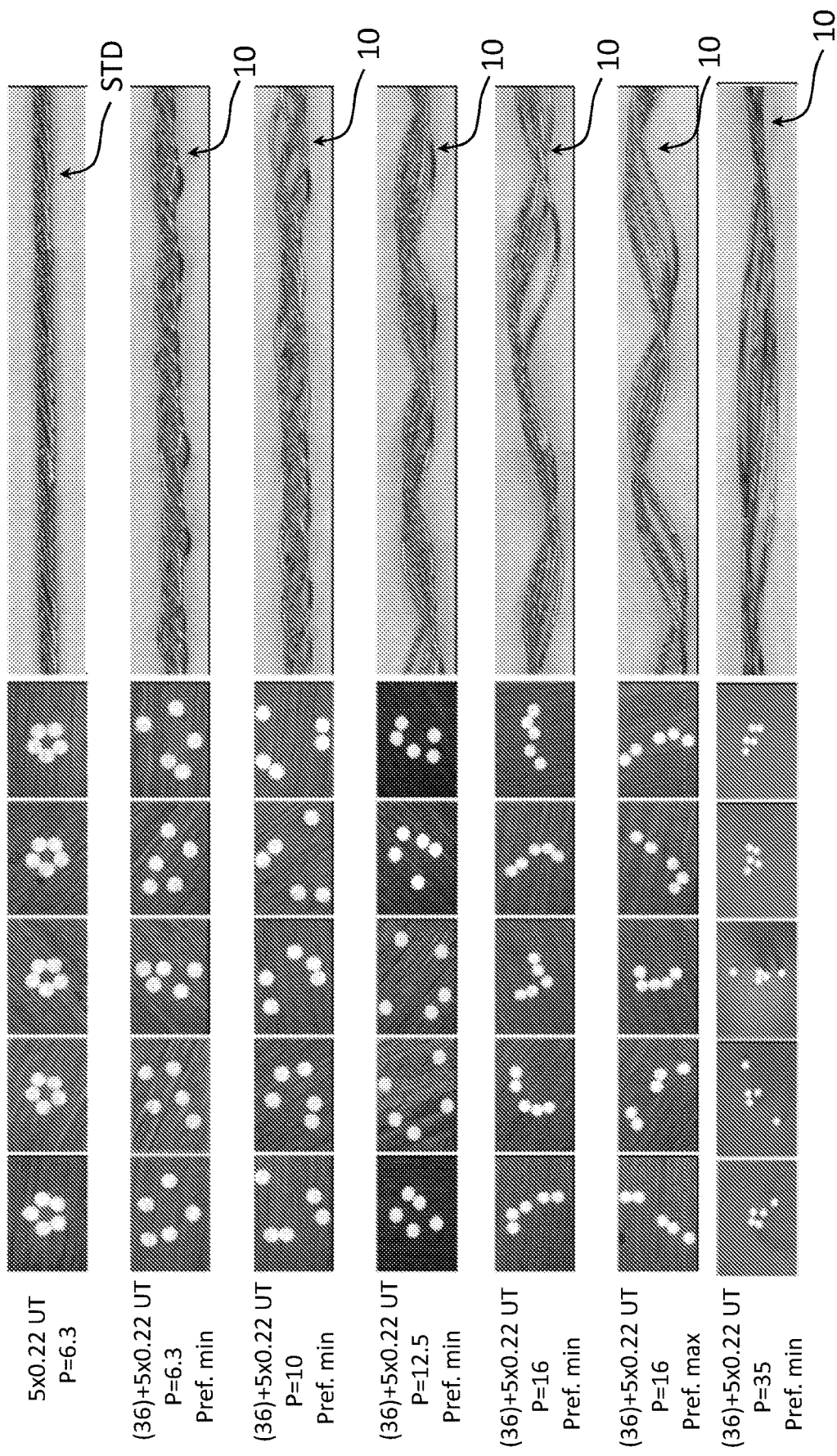
Figure 12:
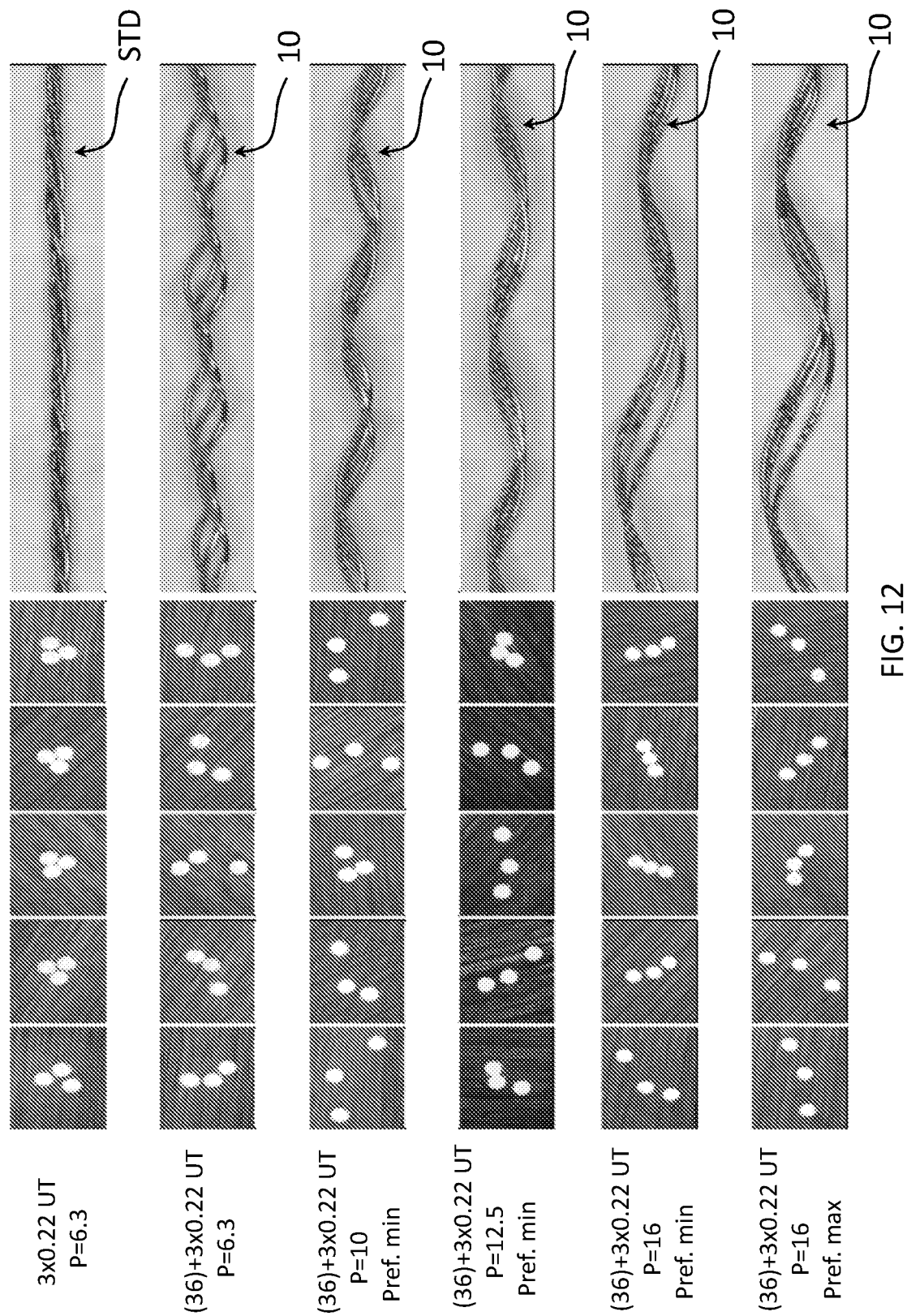
Figure 13:
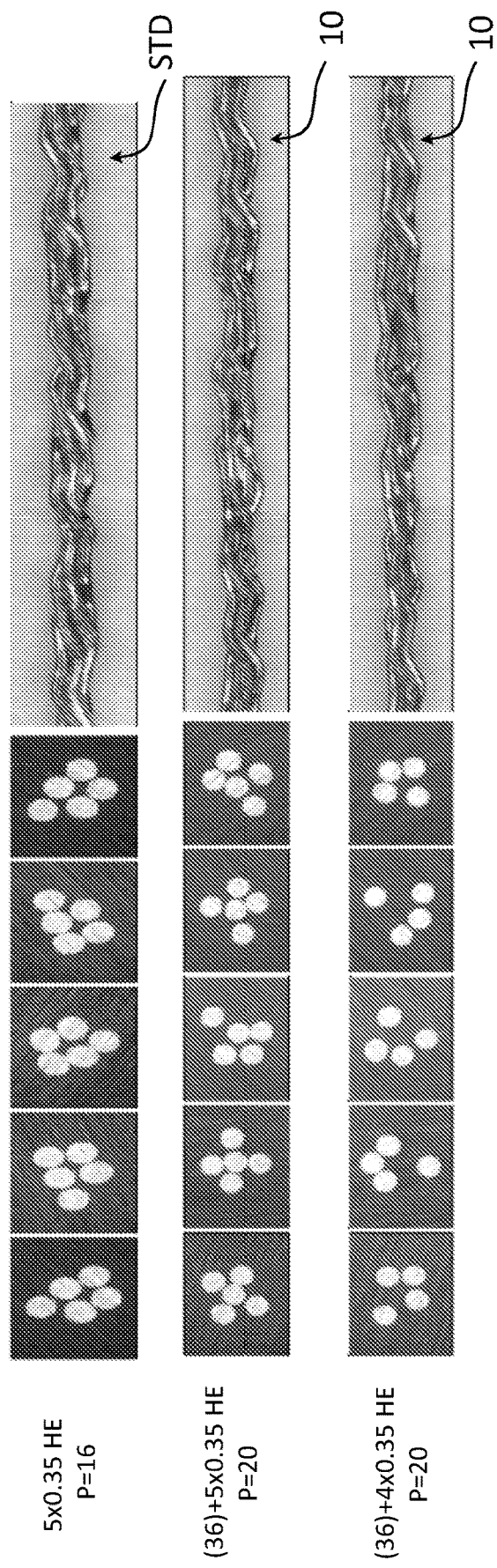

Similar considerations on the correlation between twisting pitch and machine output and/or between number of ends of the textile yarn and machine output can be made with reference to the metallic reinforcing cords 10 shown in FIGS. 11-13. The first reinforcing cord shown in each of the aforementioned figures is a conventional metallic reinforcing cord, indicated with STD. The construction of each of the reinforcing cords shown in FIGS. 11-13 is clear in light of the indications given in the aforementioned figures alongside the aforementioned reinforcing cords and of the examples discussed above.

The Applicant has made further examples of metallic reinforcing cords 10 and has compared the mechanical behavior of these reinforcing cords with that of hybrid and conventional metallic reinforcing cords. The result of the comparison is indicated in table 1 below.

TABLE 1

|  | Breaking load (N) | Elongation at break (%) | Part load elongation (%) |
| --- | --- | --- | --- |
| (36 + 36) + 4 × 0.30 UT | 979 | 4.8 | 2.68 |
| (16 + 16) + 4 × 0.30 UT | 981 | 3.69 | 1.51 |
| (16) + 6 × 0.30 HT | 1062 | 5.48 | 1.40 |
| (32) + 6 × 0.30 HT | 1113 | 9.85 | 2.37 |
| PES + 5 × 0.28 | 907 | 3.62 | 0.54 |
| PES + 5 × 0.25 | 729 | 3.99 | 0.74 |

In table 1, the first four cords are metallic reinforcing cords 10 in accordance with the present invention whereas the last two cords are conventional reinforcing cords. These last two conventional reinforcing cords are hybrid reinforcing cords comprising a textile yarn made of polyester (PES) twisted together with five metallic wires having a diameter equal to 0.28 mm (the penultimate cord in table 1) and 0.25 mm (the last cord in table 1).

In the first two metallic reinforcing cords 10 of table 1 the Applicant has used two textile yarns, each respectively comprising 36 ends (in the first reinforcing cord) and 16 ends (in the second reinforcing cord). Such textile yarns were twisted together with four UT steel wires having a diameter equal to 0.30 mm. In the third and fourth metallic reinforcing cord 10 of table 1 the Applicant has used a single textile yarn comprising 16 ends (in the third reinforcing cord) and 32 ends (in the fourth reinforcing cord). Such a textile yarn was twisted together with six UT steel wires having a diameter equal to 0.30 mm.

It should be noted that some of the metallic reinforcing cords 10 of table 1 have a (and even much greater) part load elongation and elongation at break greater than those of conventional hybrid reinforcing cords, with substantially identical rigidity and breaking load.

The Applicant has made further examples of metallic reinforcing cords 10 deemed suitable for being used in the carcass and has evaluated their breaking load and the respective elongation at break. Such reinforcing cords and the result of the aforementioned evaluation is indicated in table 2 below. Each of the two cords indicated in table 3 comprises twelve metallic wires made of UT steel having a diameter equal to 0.22 mm and twisted together with a predetermined twisting pitch. These cords are obtained by twisting together the aforementioned metallic wires and a textile yarn (which is then removed) comprising 16 ends twisted together, with a twisting pitch equal to 12.5 mm. The two cords differ from each other only in that in the second the metallic wires have been subjected to a preforming before being twisted together with the textile yarn.

TABLE 2

|  | Breaking load (N) | Elongation at break (%) | Part load elongation (%) |
|---|---|---|---|
| (16) + 12 × 0.22 UT | 1611 | 3.57 | 1.06 |
| (16) + 12 × 0.22 UT | 1604 | 4.64 | 1.76 |

The Applicant has observed that typically the metallic reinforcing cords used in the carcass structure of the tyres do not allow a suitable penetration of the surrounding elastomeric material due to their particularly closed geometry. In such reinforcing cords typically the metallic wires would be in mutual contact and thus subject to the undesired phenomenon of fretting, at the expense of the structural integrity of the tyre.

The metallic reinforcing cords 10 made in accordance with the present invention (like for example the two cords indicated in table 2) on the other hand, thanks to the free space obtained through the removal of the textile yarn and to the possibility of spacing apart the various metallic wires, allow adequate penetration of the elastomeric material inside the cord and prevent the mutual contact of the various metallic wires, at the same time reaching values of breaking load, elongation at break and part load elongations which are more than acceptable for the specific application. It is thus possible to achieve the desired structural integrity of the tyre with a smaller number of metallic wires in the carcass structure or, the number of metallic wires being equal, with metallic wires having a smaller diameter, with consequent advantages in terms of weight and cost of the tyre.

All of the example discussed above and shown in the attached figures demonstrate just how large is the possibility of manufacturing, through the process and/or the apparatus of the present invention, metallic reinforcing cords 10 having different mechanical behaviors, making it possible to identify each time the ideal one for the specific application. In particular, the reinforcing cords 10 can be used in the crossed belt structure and/or in the chafer and/or in the flipper and/or in the zero degrees belt layer of tyres for automobiles and in the zero degrees belt layer and/or in the chafer and/or in the flipper of tyres for motorcycles.

Among the particularly advantageous aspects thereof, the present invention makes it possible, in preferred embodiments thereof, to manufacture metallic reinforcing cords 10 for tyres for automobiles and motorcycles that comprise at least two metallic wires twisted together with a predetermined twisting pitch, and have a part load elongation greater preferably greater than 1%, more preferably greater than 2%, more preferably greater than 3%, even more preferably greater than 3.5%, even more preferably greater than 4%, and/or an elongation at break preferably greater than 5%, more preferably lower than 20%, even more preferably up to 12%, and/or in which the twisting pitch P is preferably greater than 2 mm, more preferably greater than 3 mm, even more preferably greater than 4 mm, even more preferably greater than 5 mm. Such reinforcing cords can also be used in types of tyres and/or in structural components of tyres in which it was not possible to use conventional metallic reinforcing cords.

This is what also emerged from a series of comparative laboratory tests carried out by the Applicant. Such tests demonstrated that the elongation at break and the part load elongation of metallic reinforcing cords 10 made in accordance with the present invention can reach values even much greater than those of the corresponding conventional metallic reinforcing cords.

Hereinafter, all of the ranges of values are obtained considering all of the following combinations of diameter of the metallic wires and number of metallic wires: minimum diameter and minimum number of metallic wires, maximum diameter and minimum number of metallic wires, minimum diameter and maximum number of metallic wires, maximum diameter and maximum number of metallic wires.

The Applicant simulated the mechanical behavior of metallic reinforcing cords manufactured with the process described above with reference to FIGS. 4, 5a and 5b and having a n×D construction, that is comprising a plurality of metallic wires twisted together, preferably with a single twisting pitch, where n is the number of such metallic wires, preferably comprised between 2 and 6, for example equal to 2 or 3 or 4, and D is the diameter of the metallic wires, selected among any of the diameter values cited above and preferably equal for all of the metallic wires of the metallic reinforcing cord. The Applicant compared the mechanical behavior of such metallic reinforcing cords with that of corresponding conventional metallic reinforcing cords having the same construction and measured, for the conventional metallic reinforcing cords, values of elongation at break comprised in the range 1.5%-2.0% and values of part load elongation comprised in the range 0.2%-0.8%, whereas for the metallic reinforcing cords manufactures with the process described above the values of elongation at break were comprised in the range 1.5%-15% and those of part load elongation were comprised in the range 0.2%-10%. According to the Applicant, metallic reinforcing cords 10 in accordance with the present invention and having the aforementioned construction have a particularly preferred application in the crossed belt structure and/or in the chafer and/or flipper and/or in the zero degrees belt layer of tyres for automobiles and in the zero degrees belt layer and/or in the chafer and/or flipper of tyres for motorcycles.

The Applicant also simulated the mechanical behavior of metallic reinforcing cords manufactured with the process described above with reference to FIGS. 4, 5a and 5b and having a n+1×D or 1+n×D construction, that is comprising a strand of metallic wires twisted together with a first twisting pitch, the strand being twisted together with a single metallic wire with a second twisting pitch that can be equal to or different from the first twisting pitch, preferably equal, where n is the number of metallic wires of the strand, which preferably is comprised between 1 and 6, for example equal to 1 or 2, and D is the diameter of the metallic wires, selected among any of the diameter values cited above, preferably equal for all of the metallic wires of the strand and not necessarily equal to that of the single metallic wire. The Applicant compared the mechanical behavior of such metallic reinforcing cords with that of corresponding conventional metallic reinforcing cords having the same construction and measured, for the conventional metallic reinforcing cords, values of elongation at break comprised in the range 1.3%-1.8% and values of part load elongation comprised in the range 0.2%-0.7%, whereas for the metallic reinforcing cords 10 manufactured with the process described above the values of elongation at break were comprised in the range 1.3%-10% and the values of part load elongation were comprised in the range 0.2%-8.0%. According to the Applicant, metallic reinforcing cords 10 in accordance with the present invention and having the aforementioned construction have a particularly preferred application in the crossed belt structure and/or in the chafer and/or flipper and/or in the zero degrees belt layer of tyres for automobiles and in the zero degrees belt layer and/or in the chafer and/or flipper of tyres for motorcycles.

The Applicant also simulated the mechanical behavior of metallic reinforcing cords manufactured with the process described above with reference to FIGS. 4, 5a and 5b and having a m+n×D construction, that is comprising a strand of metallic wires twisted together with a first twisting pitch, the strand being twisted together with a plurality of other metallic wires with a second twisting pitch that can be equal to or different from the first twisting pitch (preferably equal), where m is the number of metallic wires of the strand, which preferably is comprised between 1 and 6, for example equal to 2 or 3 or 4, and n is the number of the other metallic wires, which preferably is comprised between 1 and 6, for example equal to 2 or 3, and where D is the diameter of the metallic wires, selected among any of the diameter values cited above, preferably equal for all of the metallic wires of the strand and not necessarily equal to that of the other metallic wires. The Applicant compared the mechanical behavior of such metallic reinforcing cords with that of corresponding conventional metallic reinforcing cords having the same construction and measured, for the conventional metallic reinforcing cords, values of elongation at break comprised in the range 1.5%-2.0% and values of part load elongation comprised in the range 0.2%-0.8%, whereas for the metallic reinforcing cords manufactured with the process described above the values of elongation at break were comprised in the range 1.5%-15% and those of part load elongation were comprised in the range 0.2%-10%. According to the Applicant, metallic reinforcing cords 10 in accordance with the present invention and having the aforementioned construction have a particularly preferred application in the crossed belt structure and/or in the chafer and/or flipper and/or in the zero degrees belt layer of tyres for automobiles and in the zero degrees belt layer and/or in the chafer and/or flipper of tyres for motorcycles.

The Applicant also believes that in tyres for motorcycles it is particularly preferred to use metallic reinforcing cords 10 having a n×D construction. In this case, the main advantages offered by the use of such reinforcing cords are the high capability of penetration of the elastomeric material between the various metallic wires and the high part load elongation, with consequent high rigidity. Such advantages produce benefits in terms of weight and performance. A further advantage offered by such reinforcing cords, the elongation at break being equal to that of conventional HE or preformed metallic reinforcing cords, is that of increasing the machine output, with consequent economic and production benefits.

In the two previous paragraphs, the terms "high" should not necessarily be interpreted in absolute terms but rather also in relative terms with respect to the corresponding features of the conventional metallic reinforcing cords having the same construction. Therefore, with reference for example to the part load elongations, it is considered high simply when it is higher than that of the corresponding conventional metallic reinforcing cords.

The present invention has been described with reference to some preferred embodiments. Different changes can be made to the embodiments described above, while remaining within the scope of protection of the invention as defined by the following claims.

The invention claimed is:

1. A metallic reinforcing cord for tyres for vehicle wheels, comprising:
   i) a plurality of metallic wires twisted only to one another with a single twisting pitch; or
   ii) a single metallic wire twisted with at least one second metallic wire with a single twisting pitch; or
   iii) a plurality of first metallic wires twisted to one another with a first twisting pitch to define a first strand of metallic wires and at least one second metallic wire twisted only with the first strand of metallic wires with a second twisting pitch equal to or different from the first twisting pitch;
   wherein the metallic reinforcing cord has a part load elongation greater than or equal to 1%, the part load elongation being the difference between the percentage elongation obtained by subjecting the reinforcing cord to a traction of 50 N and the percentage elongation obtained by subjecting the reinforcing cord to a traction of 2.5 N and being evaluated with the method BISFA E7.

2. The metallic reinforcing cord according to claim 1, wherein the plurality of metallic wires twisted to one another comprises between 2 and 6 metallic wires.

3. The metallic reinforcing cord according to claim 1, wherein the single metallic wire is substantially straight.

4. The metallic reinforcing cord according to claim 1, wherein the single twisting pitch or the first twisting pitch or the second twisting pitch is greater than, or equal to, 1 mm.

5. The metallic reinforcing cord according to claim 1, wherein the single twisting pitch or the first twisting pitch or the second twisting pitch is greater than, or equal to, 3 mm.

6. The metallic reinforcing cord according to claim 1, wherein the first strand of metallic wires comprises between 2 and 6 first metallic wires.

7. The metallic reinforcing cord according to claim 1, wherein the first strand of metallic wires comprises a number of first metallic wires and is twisted with a plurality of second metallic wires, wherein the second metallic wires comprises a number of second metallic wires, wherein the number of second metallic wires is equal to or different from the number of the metallic wires of the first strand of metallic wires.

8. The metallic reinforcing cord according to claim 7, wherein the plurality of second metallic wires comprises between 2 and 7 second metallic wires.

9. The metallic reinforcing cord according to claim 1, wherein a diameter of the first metallic wires of the first strand of metallic wires is equal to or different from a diameter of the at least one second metallic wire.

10. The metallic reinforcing cord according to claim 1, wherein all the metallic wires are spaced apart from one another in any cross section of the metallic reinforcing cord.

11. The metallic reinforcing cord according to claim 1, wherein the part load elongation is greater than 3%.

12. The metallic reinforcing cord according to claim 1, wherein the part load elongation is greater than, or equal to, 3.5%.

13. The metallic reinforcing cord according to claim 1, wherein the metallic reinforcing cord has an elongation at break evaluated with the method BISFA E6 greater than, or equal to, 4.5%.

14. The metallic reinforcing cord according to claim 1, wherein the metallic reinforcing cord has an elongation at break evaluated with the method BISFA E6 greater than, or equal to, 6%.

* * * * *